US 6,616,563 B2

(12) United States Patent  
Inoue et al.

(10) Patent No.: US 6,616,563 B2
(45) Date of Patent: Sep. 9, 2003

(54) TRANSMISSION OF WORKING VEHICLE

(75) Inventors: Toru Inoue, Hyogo (JP); Toshiyuki Hasegawa, Hyogo (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 09/942,556

(22) Filed: Aug. 31, 2001

(65) Prior Publication Data

US 2002/0028721 A1 Mar. 7, 2002

(30) Foreign Application Priority Data

Sep. 4, 2000 (JP) .......................... 2000-266847
Mar. 6, 2001 (JP) .......................... 2001-062478

(51) Int. Cl.$^7$ .............................................. F16H 37/08
(52) U.S. Cl. ....................................... 475/198; 475/231
(58) Field of Search ................................ 475/198, 206, 475/231, 237, 210, 900; 188/71.2, 181 T, 67

(56) References Cited

U.S. PATENT DOCUMENTS

| 2,107,341 A | * | 2/1938 | Peo .............................. 192/104 |
| 3,830,117 A | * | 8/1974 | Kodama et al. ............... 475/275 |
| 4,667,784 A | * | 5/1987 | Cronin .......................... 180/6.44 |
| 4,696,164 A | * | 9/1987 | Giere ............................. 180/249 |
| 4,781,259 A | * | 11/1988 | Yamaoka et al. ............. 180/305 |
| 4,893,525 A | * | 1/1990 | Gabor ............................ 475/225 |
| 5,172,787 A | * | 12/1992 | Kobayashi ..................... 180/197 |
| 5,617,764 A | * | 4/1997 | Komura et al. ............... 475/206 |
| 5,792,019 A | * | 8/1998 | Park .............................. 475/206 |
| 5,853,343 A | * | 12/1998 | Eggert et al. ................. 475/210 |
| 5,950,500 A | * | 9/1999 | Okada et al. ................. 180/305 |
| 6,062,114 A | * | 5/2000 | Rahm ............................ 81/473 |
| 6,254,504 B1 | * | 7/2001 | Goi et al. ..................... 475/216 |
| 6,293,890 B1 | * | 9/2001 | Kaku ............................ 188/71.5 |
| 6,363,815 B1 | * | 4/2002 | Ishimaru et al. ............. 74/730.1 |
| 6,413,181 B2 | * | 7/2002 | Okada .......................... 475/83 |
| 6,419,606 B1 | * | 7/2002 | Tengan et al. ................ 475/5 |
| 6,436,002 B1 | * | 8/2002 | Ishikawa et al. .............. 475/231 |
| 6,460,421 B1 | * | 10/2002 | Hasegawa et al. ............ 73/862.29 |

FOREIGN PATENT DOCUMENTS

WO    wo99/52733    * 10/1999

* cited by examiner

Primary Examiner—Sherry Estremsky
Assistant Examiner—David D. Le
(74) Attorney, Agent, or Firm—Sterne, Kessler, Goldstein & Fox P.L.L.C.

(57) ABSTRACT

A transmission for a working vehicle having an engine mounted on a bodywork frame such that a crankshaft of the engine is disposed horizontal and is oriented perpendicular to the longitudinal direction of the vehicle. The transmission comprises an input shaft for receiving power of the engine through a continuously variable transmission, an output shaft disposed in parallel with the input shaft, a pair of left and right axles extended oppositely to each other and in parallel with the output shaft, a differential connecting the left and right axles with each other in a differential manner, a transmission housing containing the differential, a pair of left and right axle housings, each of which houses each of the pair of axles, having mounting portions for mounting to the bodywork frame, and a wet-type disc brake device provided around a portion of the axles covered by the axle housings.

3 Claims, 18 Drawing Sheets

TRANSMISSION OF WORKING VEHICLE

BACKGROUND OF THE INVENTION

1. Field of the Invention

The present invention relates to a structure of a transmission comprising a belt-type continuously variable transmission (hereafter referred to as 'CVT'), which is suitable for a working vehicle.

2. Background Art

A conventional working vehicle, e.g., a truck, includes a belt-type CVT connecting an output shaft of an engine and an input shaft of the transmission such that rotation of the output shaft of the engine is transmitted to its axles and drives them. In this vehicle structure, a sensing mechanism is provided at the CVT and detects rotary speed or load of the engine so as to automatically steplessly reduce/increase the speed reduction ratio according to the increase/decrease of rotary speed of the engine or the decrease/increase of the engine load.

In addition, it is well-known to laterally mount an engine on a vehicle so as to locate its crankshaft perpendicular to the longitudinal direction of the vehicle and in parallel to an input shaft of a transmission, an output shaft of the transmission, and axles. This described vehicle structure especially facilitates interposing a belt-type CVT between the crankshaft of the engine and the input shaft of the transmission because both shafts are parallel to each other. Moreover, the transmission in this vehicle structure may transmit power via economical spur wheels because shafts therein are disposed parallel to one another. Therefore, the vehicle structure is advantageous in contributing to the reduction of assembly and material costs.

An object of the invention is to provide a transmission for a working vehicle that is simplified so that the manufacturing costs can be more and more reduced.

Further, conventional transmissions with differential locking mechanisms provide a shaft for operating the differential locking mechanism that is axially, slidably supported and is disposed parallel to the axles. The differential locking slider is engaged with a fork fixed onto the shaft so as to slide the differential locking slider integrally with the shaft, thereby switching between a differential-locking mode and a differential-unlocking mode.

However, in the above conventional structure, the fork engaged with the differential locking slider is apt to be large, thereby inhibiting miniaturization of the transmission. And, because a space inside of the transmission housing is required for straightly moving such a large fork back and forth at a set stroke to operate the differential locking slider, further miniaturization of the transmission is difficult.

BRIEF SUMMARY OF THE INVENTION

The transmission of the present invention is applied to a working vehicle having an engine mounted on a bodywork frame such that a crankshaft of the engine is disposed horizontal to the ground and is perpendicular to the longitudinal direction of the vehicle. The transmission comprises an input shaft for receiving power of the engine through a CVT, an output shaft disposed in parallel with the input shaft, a pair of left and right axles aligned with and extending out opposite to each other and in parallel with the output shaft, a differential connecting the left and right axles with each other in a differential manner, a transmission housing containing the differential, a pair of left and right axle housings mounted onto left and right faces of the transmission housing respectively, each of which houses each of the pair of axles, having mounting portions for mounting to the bodywork frame, and a wet-type disc brake device provided around a portion of the axles covered by the axle housings. Therefore, a load, which is applied to drive wheels fixed on the axles, can be supported by the transmission housing through the axle housings, thereby simplifying the structure of a vehicle. And, in comparison with the conventional structure having an output of a differential that is transmitted to the drive wheels through universal joints and a dry-type brake device, manufacturing costs can be reduced. Furthermore, due to the wet type disc brake device, durability and reliability of the brake device can be improved.

The input shaft is disposed closer to the engine than said axles in the longitudinal direction of the vehicle. Therefore, the position of the input shaft, while keeping a required distance from the axles, can be lower than that when being above the axles. Due to this arrangement, even if the amount of lubricating oil in the transmission housing is small, splash lubrication for the input shaft can be sufficient. Consequently, the amount of lubricating oil can be saved, thereby reducing manufacturing costs and weight of the transmission. And, when the present invention is applied to a transmission of a truck, its deck can be located at a low position, thereby improving capacity of the deck and sinking the center of gravity of the truck.

The transmission further comprises a drive train which can switch the rotational direction of the output shaft in relation to the rotational direction of the input shaft, wherein the drive train drivingly connects the input shaft with a portion of the output shaft, which is nearer to one end of the output shaft, a prime rotary object provided on the output shaft nearer to other end of the output shaft, a follower rotary object serving as an input means of said differential, the follower rotary object being engaged with the prime rotary object, and a centrifugal governor for changing the output of the engine according to the variation of the rotational speed of the input shaft, the centrifugal governor being disposed at a portion of the input shaft facing toward the prime rotary object. Therefore, by the adoption of the centrifugal governor which is smaller and less expensive than a torque governor, manufacturing costs of the transmission can be saved and compactness thereof can be improved. And, because the centrifugal governor is placed at empty space inside of the transmission housing, a layout of the transmission can be simple and space-saving, thereby further improving compactness of the transmission.

The transmission further comprises a pair of left and right transmission housing parts into which the transmission housing is laterally dividable through a surface which is perpendicular to a longitudinal direction of said axles, wherein the differential is supported at its left and right portions by the left and right transmission housing parts, respectively, and bearings provided at outer ends of the respective axle housings, wherein the bearings support outward portions of the axles projecting leftward and rightward from the differential. Therefore, because the differential can be directly supported by the transmission housing without intervention of the axles, when manufacturing of the transmission, a convenient assembling method (i.e., a method of putting in axles after fixing the differential to the transmission housing by joining together of left and right housing parts) can be adopted. Furthermore, since outward portions of the axles are supported by the axle housings through the bearings, the weight of the vehicle can be surely supported by the axles through the axle housings.

A portion of at least one of said the housings to be attached to the transmission housing is expanded so as to be bowl-like shaped. The wet-type disc brake is disposed in the bowl-like shaped portion of the axle housing, and an arm for operating the wet-type disc brake is disposed outside the bowl-like shaped portion of the axle housing. Therefore, because a room which houses the wet-type disc brake (i.e. the bowl-like shaped portion) is integrally formed with the axle housing, manufacturing costs of the transmission can be reduced. And, because the arm for operating the wet-type disc brake is disposed outside the bowl portion of the axle housing, the operating system from the arm to wet-type disc brake can be compactly and simply formed.

A transmission of a working vehicle comprises a differential, a transmission housing containing the differential, a pair of left and right axles connected with each other in a differential manner by the differential, an axle housing mounted onto one of left and right faces of the transmission housings to support one of the axles, wherein a joint space is formed in a joint portion between the transmission housing and the axle housing, a differential locking slider which can switch between a differential mode for connecting the left and right axles with each other in a differential manner and a differential-locking mode for integrally connecting the axles, a friction disc provided on the axle supported by the axle housing, and a pressure member which pushes the friction disc so as to brake the axle, wherein the pressure member and the differential locking slider are disposed substantially coaxially with each other in the joint space. Therefore, the differential locking slider and the pressure member can be arranged in a compact length of longitudinal direction of the axles, thereby contributing to space-saving of the transmission.

A guide portion for axially slidably supporting said pressure member is provided in a flanged portion formed on an outer side wall of the transmission housing for mounting the axle housing, the differential locking slider is disposed in the guide portion, and a round wall of the guide portion is partly notched such that an arm for operating the differential locking slider is inserted through the notched portion. Therefore, because the pressure member is supported by the guide portion and the differential locking slider is located inside of the guide portion, both of them can be apportioned between inside and outside of the guide portion in a compact mass. And, because the round wall of the guide portion is partly notched and the arm for operating the differential locking slider is inserted through the notched portion, the simple structure for operating the differential locking slider located in the guide portion from the outside of the guide portion can be achieved.

The pressure member is rotatable along said round wall of said guide portion by a brake operating shaft supported by said axle housing, and a cam body, which thrusts the pressure member in correspondence to as rotational degree of the pressure member, is supported around the round wall of the guide portion. Therefore, since the pressure member rotates while it is guided by an outer peripheral surface of the round wall of the guide portion, a special structure for axial alignment of the pressure member can be eliminated. And, since the cam body is supported around the round wall of the guide portion, the compact structure that the pressure member pushes the friction discs by axially sliding while rotating can be achieved.

A rotational axis of the arm for operating the differential locking slider is disposed at a position which is offset from a virtual plane containing the rotational axis of said pressure member, and the brake operating shaft is placed in parallel with the axles on a opposite side to the arm with the virtual plane between. Therefore, an operating system of the differential locking slider and an operating system of the brake device can be compactly arranged and can avoid interruptions with each other, thereby miniaturizing the transmission.

Furthermore, the transmission further comprises an input shaft projecting outward from one of left and right sides of said transmission housing and a follower pulley constituting a belt-type CVT disposed onto an outward projecting portion of the input shaft, wherein said differential locking slider is disposed at a position nearer to the other of the left and right sides of the transmission housing. Therefore, an operating system of the differential locking slider can be disposed in a position wherein the operating system can avoid interruptions with the CVT, thereby improving the compactness of the transmission.

DETAILED DESCRIPTION OF THE INVENTION

Figure 1:
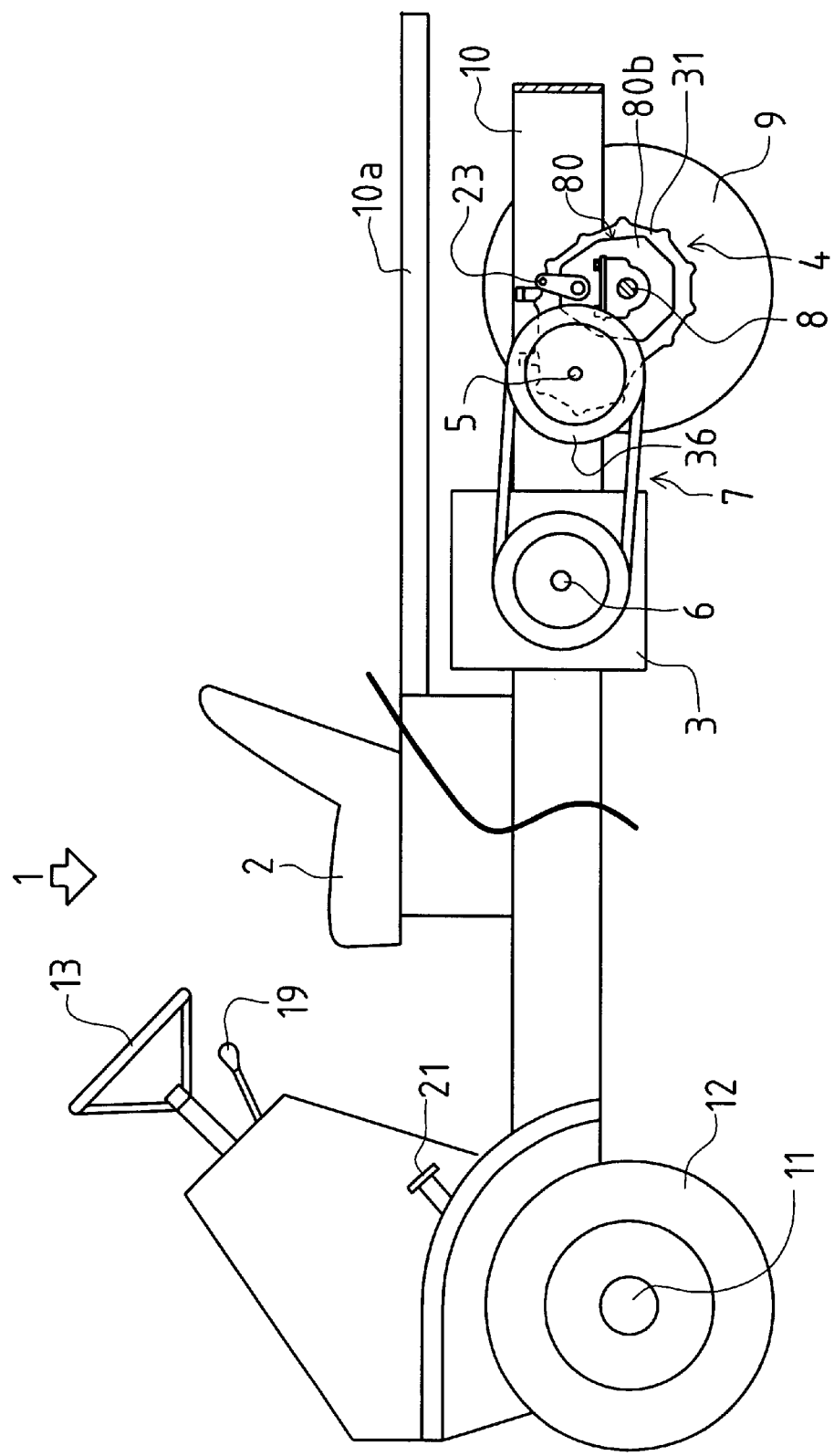
FIG. 1 is a general side view of a truck to which a transmission of the present invention is applied.

A truck 1 as an embodiment of the present invention is shown in FIG. 1. A bodywork frame 10 is disposed in the longitudinal direction of the vehicle. An engine 3 is mounted on the bodywork frame 10 at the rear of an operator's seat 2. The engine 3 is disposed such that its crankshaft (as an output shaft of the engine) 6 is horizontally oriented perpendicular to the longitudinal direction of the vehicle.

Figure 2:
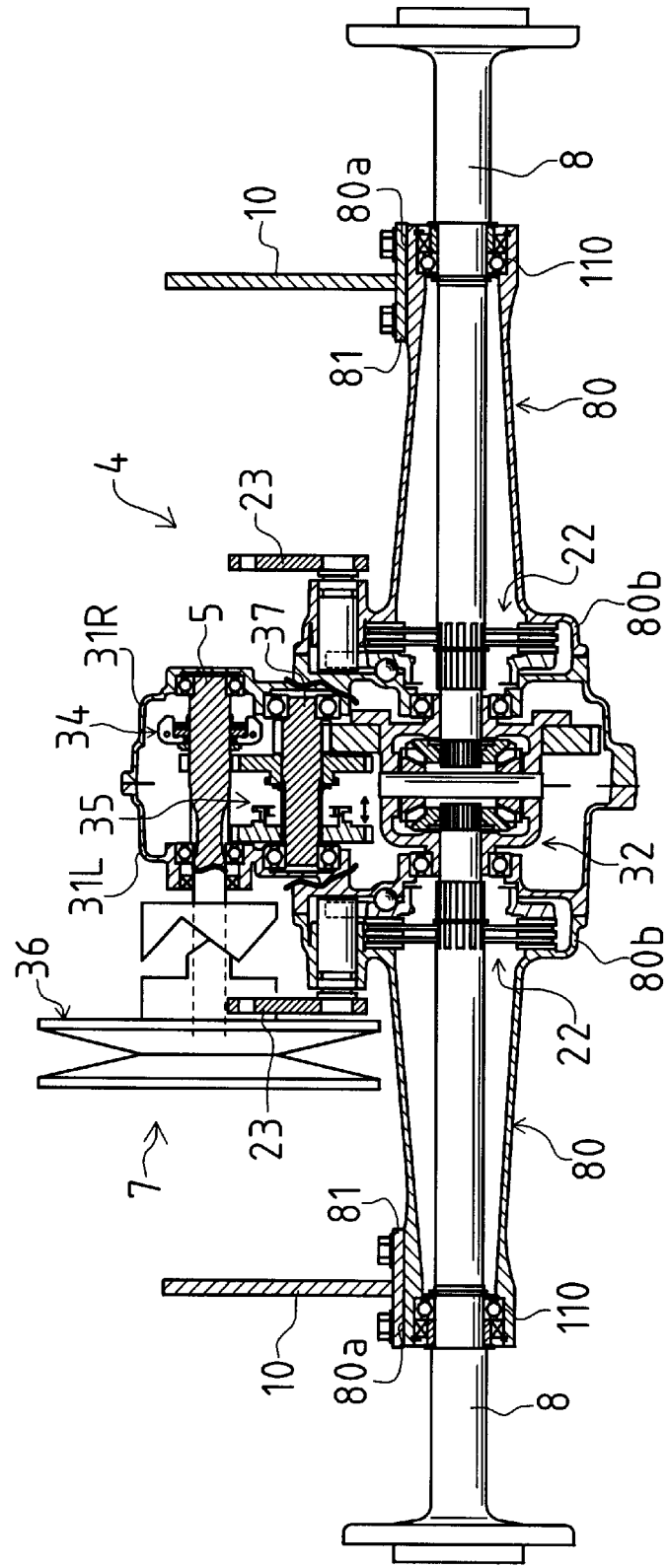
FIG. 2 is a sectional rear elevation showing the general structure of the transmission and axles.

At the rear of the engine 3, a transmission 4 of the present invention is supported by the bodywork frame 10 through a pair of axle housings 80 (described below). A pair of left and right slender flat boards are disposed in a longitudinal direction of the vehicle and parallel to each other, and the rear end portion of the flat boards are connected with each other, thereby forming the bodywork frame 10 having a U-shape in a plan view. As shown in FIG. 2, axle housings 80 are fixed onto the bodywork frame 10 such that a housing 31 of the transmission 4 is located between the left and right flat boards.

A deck frame 10a is disposed above the transmission 4 and the engine 3, and is supported by the bodywork frame 10, such that the truck can carry loads.

An input shaft 5 of the transmission 4 projects leftward from the transmission housing 31. The input shaft 5 is connected to the output shaft 6 of the engine 3 through a belt-type automatically continuous variable transmission (hereinafter referred to as CVT) 7. A pair of left and right rear axles 8 project outward from both left and right sides of the transmission housing 31. Each of rear wheels 9 as drive wheels is provided at the outer end of each of the rear axles 8.

A front transaxle case (not shown) is supported at a front portion of the vehicle. The front transaxle case houses a pair of left and right front axles 11, and a differential (not shown) which connects the front axles 11 with each other in a differential manner. Each of the front axles 11 supports each of front wheels 12 at its outer end. The front wheels 12 are steerable by a steering wheel 13 disposed at the front of the operator's seat 2.

A switching lever 19, which is operated to select the direction of travel between forward and backward, is disposed at the side of the steering wheel 13. A speed-changing pedal 21 is provided at the front of the operator's seat 2, and is linked with a throttle valve (not shown) which adjusts the volume of injected fuel. By changing the degree of opening of the throttle valve according to degree of depressing of the speed-changing pedal 21, the output speed of the engine 3 can be increased or reduced.

The power, which is transmitted from the output shaft 6 to the input shaft 5 of the transmission 4 through the CVT 7, is transmitted into the transmission housing 31 through the input shaft 5. The power passes through a power transmission way which forming the transmission 4, and is finally transmitted to the rear wheels 9 through the rear axles 8, thereby driving the truck 1.

A pair of brake devices (not shown in FIG. 1) are provided in the axle housings 80 so as to brake the pair of left and right rear axles 8, respectively. Each of the brake devices 22 can be operated by each of a pair of brake control arms 23 which are supported rotatably on each of the left and right axle housings 80. The brake control arms 23 are interlocked with only one brake pedal (not shown) disposed in the vicinity of the speed-changing pedal 21, such that the left and right rear axles 8 are braked at the same time by depressing the brake pedal.

Next, description will be given on the structure in the transmission housing 31 in accordance with FIG. 2.

The transmission housing 31, which houses the transmission 4, is formed of a pair of left and right housing members 31L and 31R (serving as transmission housing parts) which are joined to each other at their flat and peripheral joint faces in a plane which is perpendicular to a longitudinal direction of the rear axles 8. In the transmission housing 31, the input shaft 5, a centrifugal governor 34 which detects the rotational speed of the input shaft 5, a differential 32 which connects the left and right rear axles 8 in a differential manner, and a direction-of-travel switching mechanism 35 operated by the switching lever 19, and so on are disposed.

The input shaft 5 is laterally and rotatably supported at the midway portion in a vertical direction of the transmission housing 31. One end of the input shaft 5 projects laterally outward from a left side of the transmission housing 31. A follower split pulley 36 is provided on the outward projecting portion of the input shaft 5, such that the follower split pulley 36 serves as an output section of above-mentioned belt-type CVT 7.

Figure 3:
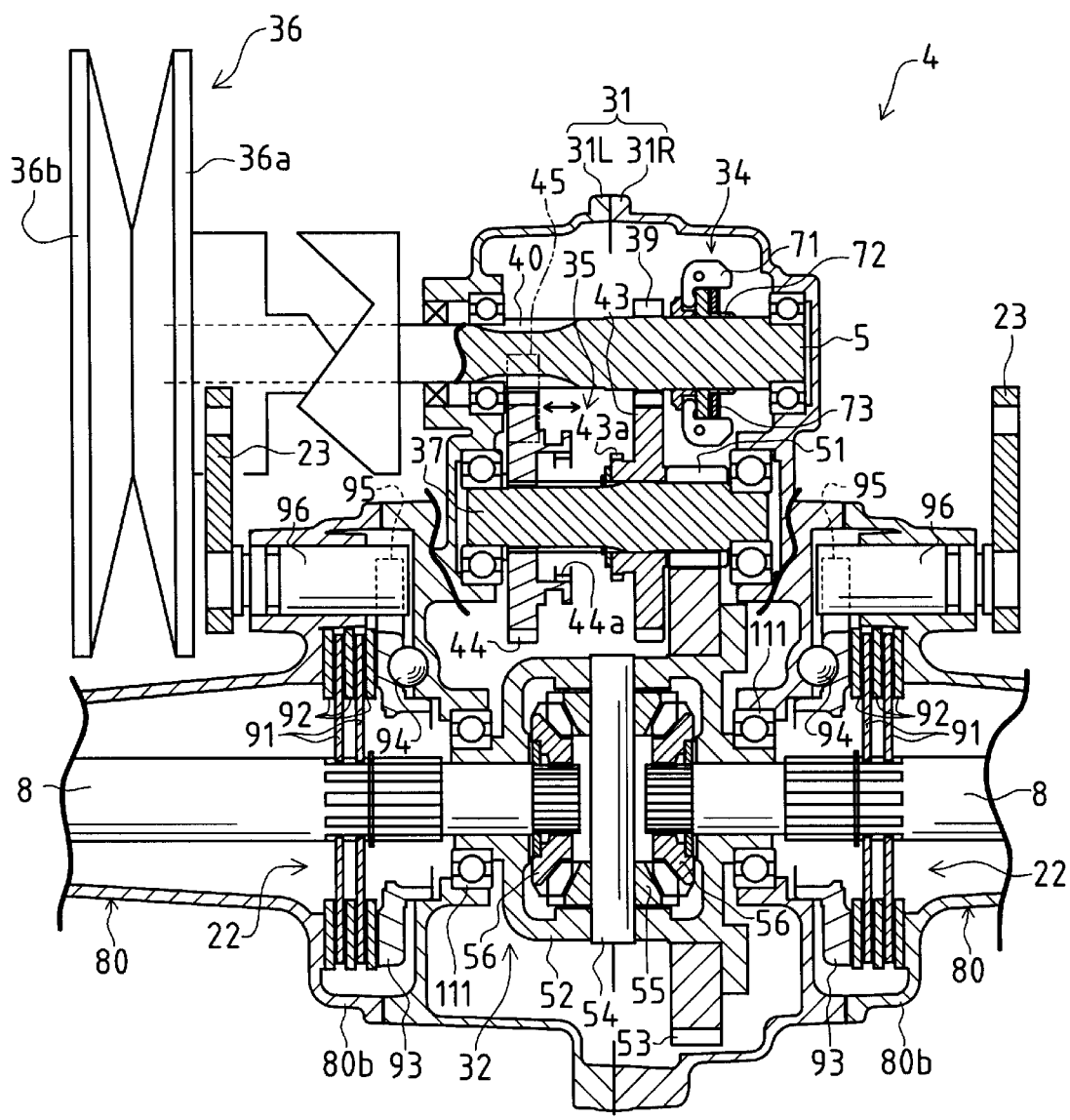
FIG. 3 is a grossly enlarged sectional rear elevation showing the structure in a transmission housing.
Figure 4:
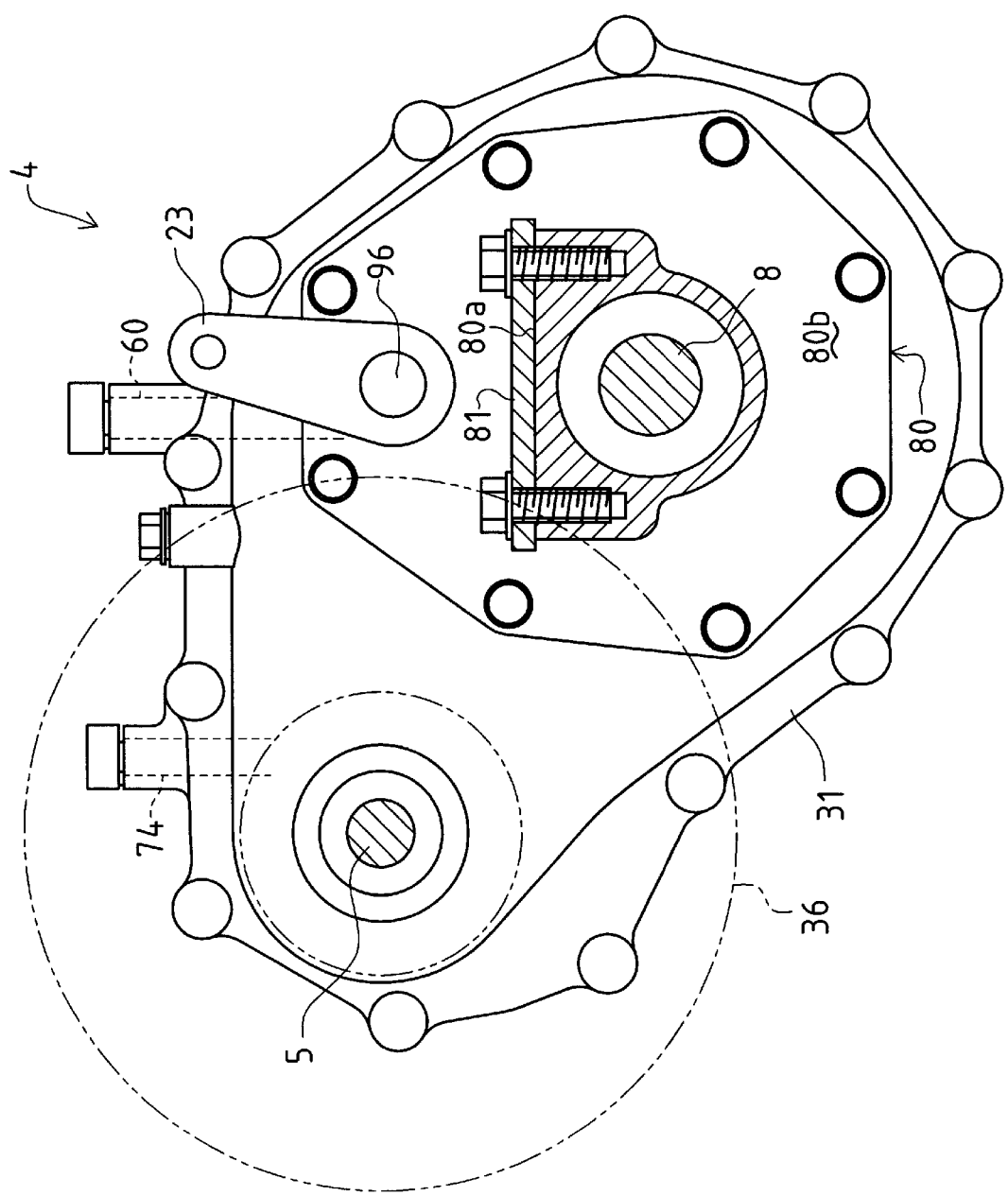
FIG. 4 is a side view of the transmission.

The follower split pulley 36 is formed of two pulley members 36a and 36b which are connected with each other forming torque cam as shown in FIG. 3. The two pulley members 36a and 36b approach each other when torque which resists the rotation of the engine 3 (e.g. torque generated at the rear wheels 9 when the truck 1 climbs a hill) increases, such that an effective diameter of the follower split pulley 36 increases so as to increase the speed reduction ratio of the CVT 7.

Next, description will be given on the centrifugal governor 34.

This centrifugal governor 34, disposed around a portion of the input shaft 5 facing toward a later-discussed output gear 51, comprises a governor weight 71, a lifter 72, a governor fork 73, a rotation shaft 74 and an output arm 75. The governor weight is a sensor which is rotated outward according to centrifugal force so as to detect the rotational speed of the input shaft 5. The lifter 72 is slidden axially at the same time when the governor weight 71 rotates outward. The governor fork 73 is engaged with the lifter 72. The rotation shaft 74 is supported rotatably at the ceiling of the transmission housing 31. The output arm 75 is disposed on the outside of the transmission housing 31 so as to rotate integrally with the rotation shaft 74.

The output arm 75 is interlocked with the throttle valve of the engine 3 through a linkage, such that the centrifugal governor 34 detects the rotational speed of the input shaft 5 and adjusts the volume of injected fuel, thereby changing the output of the engine 3 according to the variation of the rotational speed of the input shaft 5.

Next, description will be given on the direction-of-travel switching mechanism 35 serving as a drive train to allow switching the rotational direction of the output shaft 37 in relation to the rotational direction of the input shaft 5.

The input shaft 5 is notched on its periphery so as to form two gears, i.e., a forward drive gear 39 and a reverse drive gear 40. The output shaft 37 is disposed parallel to the input shaft 5 (and the rear axles 8). Around a portion of the output shaft 37 which is nearer to the left end of the output shaft 37, a forward follower gear 43 is relatively rotatably disposed, and a clutch gear 44 are not relatively rotatably but axially slidably disposed. The forward follower gear 43, which is constantly engaged with the forward drive gear 39, is notched on its side face so as to form a toothed portion 43a, thereby being engaged/disengaged with/from a toothed portion 44a formed on the side face of the clutch gear 44 facing the toothed portion 43a.

An idle gear 45, designated by a phantom line in FIG. 3, is constantly engaged with the reverse drive gear 40. The clutch gear 44 also can be engaged/disengaged with/from the idle gear 45.

The clutch gear 44 is axially slid so as to engage with either the forward follower gear 43 or the idle gear 45, thereby selectively bringing the output shaft 37 into a regularly directed rotation or a reversely directed rotation.

Figure 5:
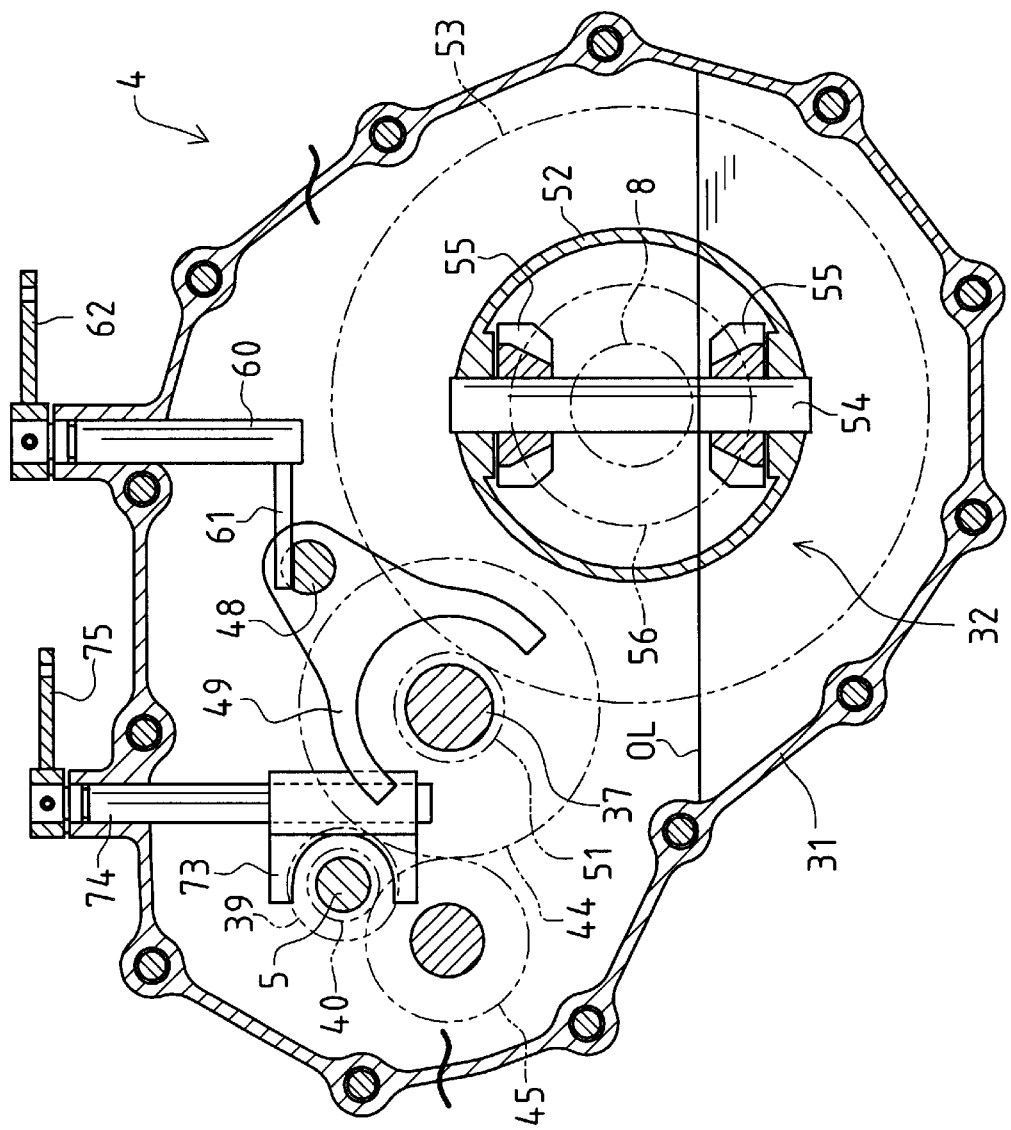
FIG. 5 is a sectional side view of the transmission.

As shown in FIG. 5, a clutch fork shaft 48 is straightly, slidably disposed adjacent to the clutch gear 44, and a clutch fork 49 is fixed onto the clutch fork shaft 48 and is engaged with the clutch gear 44. A control shaft 60 is vertically and rotatably supported at the ceiling of the transmission housing 31 so as to slide the clutch fork shaft 48. An arm 61 is fixed onto a bottom portion of the control shaft 60 and an apex portion of the arm 61 is engaged with a groove formed on the clutch fork shaft 48. A top portion of the control shaft 60 projects upward, and an operating arm 62 is fixed onto the upward projecting portion of the control shaft 60. The operating arm 62 is interlocked with the above-mentioned switching lever 19, thereby allowing the clutch gear 44 to slide to a forward position or a backward position.

A portion of the output shaft 37, which is nearer to the right end of the output shaft 37, is notched on its periphery so as to form the output gear 51 serving as a prime rotary object, thereby transmitting the rotation of the output shaft 37 to the differential 32.

The differential 32 is constructed normally for differentially connecting inner end portions of the pair of rear axles 8, which extend oppositely to each other. In detail, as shown in FIG. 3, the differential 32 comprises a hollow differential casing 52, a ring gear 53, a pinion shaft 54, two pinions 55, and two differential side gears 56. The differential casing 52 is disposed coaxially with the rear axles 8, and rotatably supported at its left and right portions by the left and right housing members 31L and 31R through bearings 111, respectively. The ring gear 53, serving as a follower rotary object, is fixed around the differential casing 52 and is engaged with the output gear 51 of the output shaft 37. The pinion shaft 54 is disposed in the differential casing 52 perpendicular to the rear axles 8 so as to be rotatable integrally with the differential casing 52. The pinions 55, which are bevel gears, are disposed oppositely to each other and rotatably supported on the pinion shaft 54. Each of the differential side gears 56 which are bevel gears is fixed onto an inner end of each of the rear axles 8 so as to engage with both the pinions 55.

Next, the axle housings 80, each of which supports each of the rear axles 8, will be described.

The two axle housings 80 are formed in the same cylindrical shape. As shown in FIG. 2, an inner end of each of the axle housings 80 is symmetrically fixed onto each of left and right sides of the transmission housing 31, so as to cover an opening portion formed on each of the left and right side faces of the transmission housing 31. An outer end of each of the axle housings 80 projects outward along the rear axles 8. A supporting portion is formed at the projecting end portion of each of the axle housings 80 so as to support an outward portion of each of the rear axles 8 by a bearing 110. Thus, a portion of each rear axle 8 adjacent to its proximal end is covered at a certain length with each axle housing 80.

A top portion of the supporting portion of each of the axle housings 80 is formed into a mounting portion 80a having a horizontally flat shape. The mounting stay 81 in a flatboard-like shape, which is fixed onto a bottom end of the bodywork frame 10, is fixed onto the mounting portion 80a by screwing bolts so as to support the axle housings 80 by the bodywork frame 10. In such a structure, a load applied to the rear wheels 9 can be supported by the transmission housing 31 through the axle housings 80, thereby simplifying the structure of a vehicle.

As shown in FIG. 3, left and right brake devices 22, for braking the rear axles 8, is provided around portions of the rear axles 8 covered by the axle housings 80, respectively. Portions of the axle housings 80 to be attached to the transmission housing 31 are expanded so as to be bowl-like shaped. Each of brake devices 22 is housed in each of bowl-like shaped portions 80b.

In each of the brake devices 22, first friction disc 91 are axially slidably but not relatively rotatably provided onto the rear axle 8. And, second friction discs 92 are slidably but not relatively rotatably engaged with the axle housing 80. Each of the first friction discs 91 and each of the second friction discs 92 are arranged alternately. A pressure member 93 is fitted axially slidably and rotatably onto the transmission housing 31 for pressuring the multi-layered friction discs 91 and 92. Cam grooves are formed on the pressure member 93, and each of steel balls 94, serving as cam bodies, is intervened between each of the cam grooves and the axle housing 80. A brake control shaft 96 is rotatably supported by the axle housing 80, and a cam is formed at one end portion of a brake control shaft 96 in a D-shape (not shown) so as to push an arm 95 formed at a top portion of the pressure member 93. The above-mentioned brake control arm 23 is fixed onto one end of the brake control shaft 96, which projects outward from the axle housing 80. The brake control arm 23 is disposed outside above-mentioned bowl-like shaped portion 80b.

In this structure, when the brake control arm 23 is operated, the brake control shaft 96 is rotated and the above-mentioned D-shape cam pushes the arm 95 so as to rotate the pressure member 93. By the action of cam between the cam groove and the steel ball 94, the pressure member 93 is slidden axially and make the friction discs 91 and 92 engage with one another, thereby braking the rear axle 8.

The axle housings 80 and the transmission housing 31 are filled with oil, i.e., the brake devices 22 are of a wet type, thereby being improved in its durability and reliability.

The input shaft 5 is displaced from a position above the rear axles 8 so as to be nearer to the engine 3 than the rear axles 8 in the longitudinal direction of the vehicle such that the position of the input shaft 5 can be lowered in the transmission housing 31. Consequently, even if the amount of the filled oil is small and oil level OL is low, splash lubrication for the input shaft 5 by the rotation of the ring gear 53 of the differential 32 can be sufficient because the input shaft 5 is located at the low position.

Figure 6:
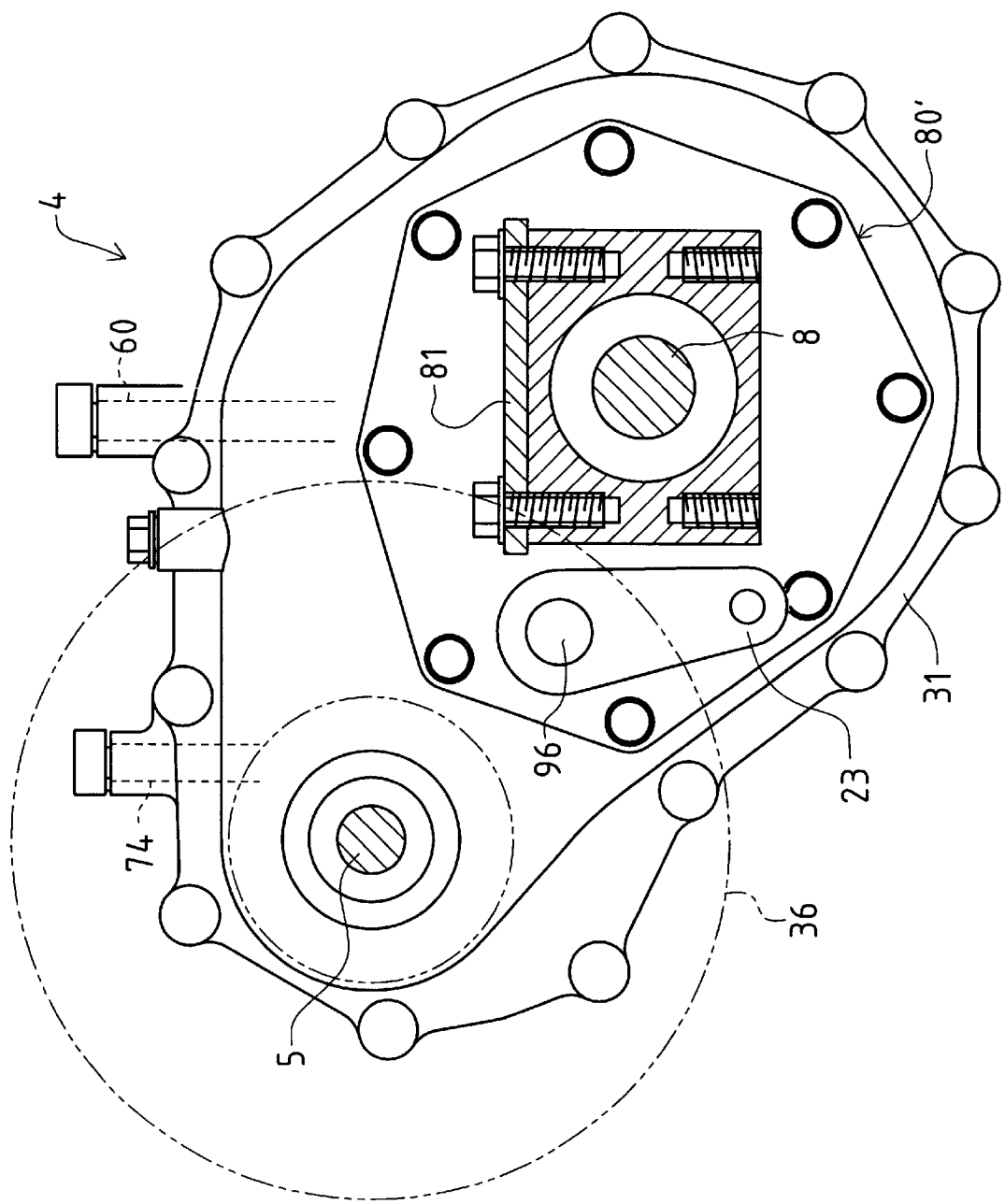
FIG. 6 is a sectional side view of the transmission when modified axle housings are attached.

Various modification of the above-mentioned embodiment is possible. For example, as shown in FIG. 6, the structure that axle housings 80' are fixed onto the transmission housing 31 leaning forward or backward so as to locate the brake control arm 23 at a low position, may be available.

Figure 7:
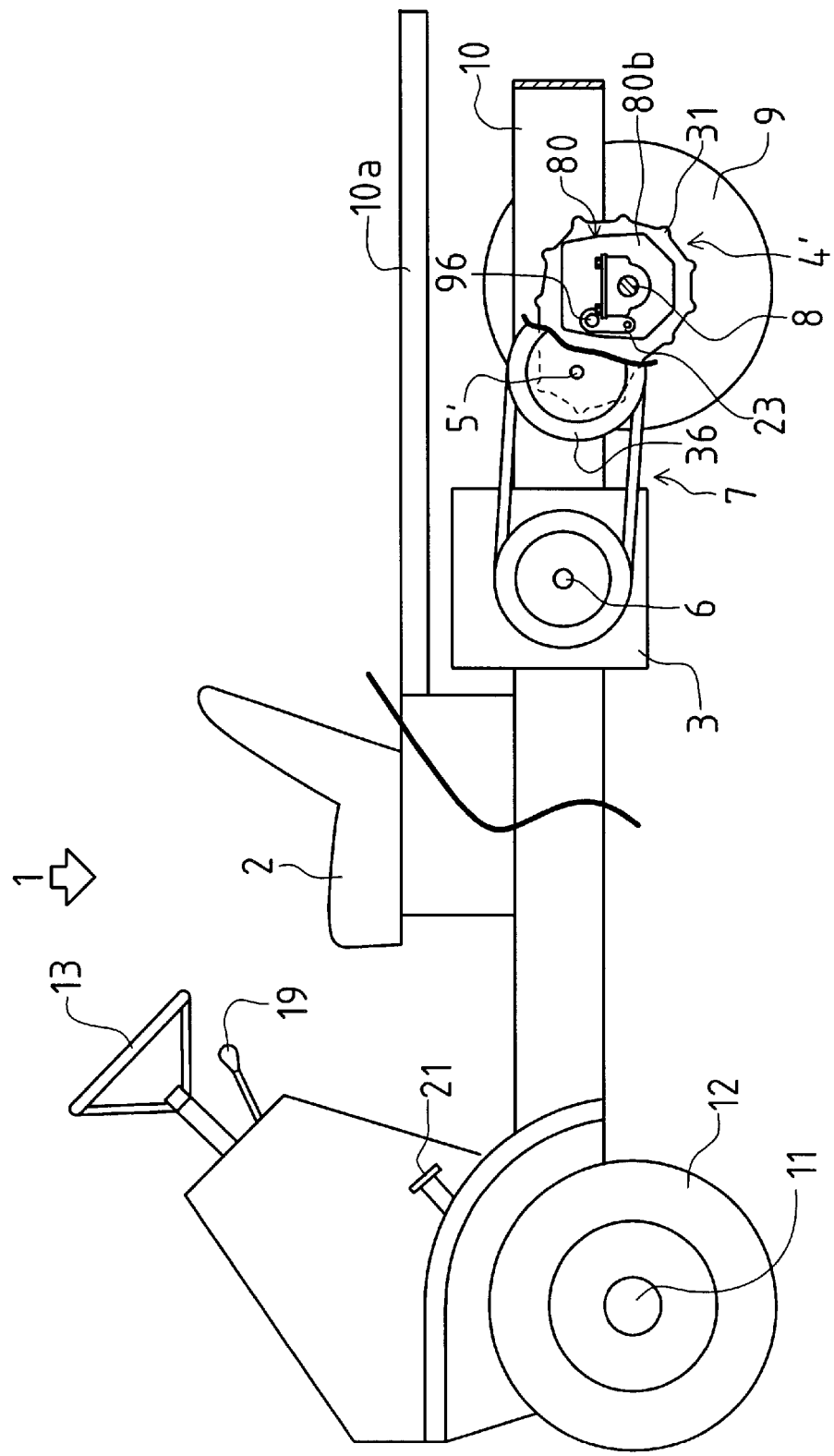
FIG. 7 is a general side view of a truck having a transmission wherein a differential locking mechanism is provided.

Next, description will be given on a transmission 4' wherein a differential locking mechanism is provided. A truck to which the transmission 4' is applied is shown in FIG. 7.

Figure 8:
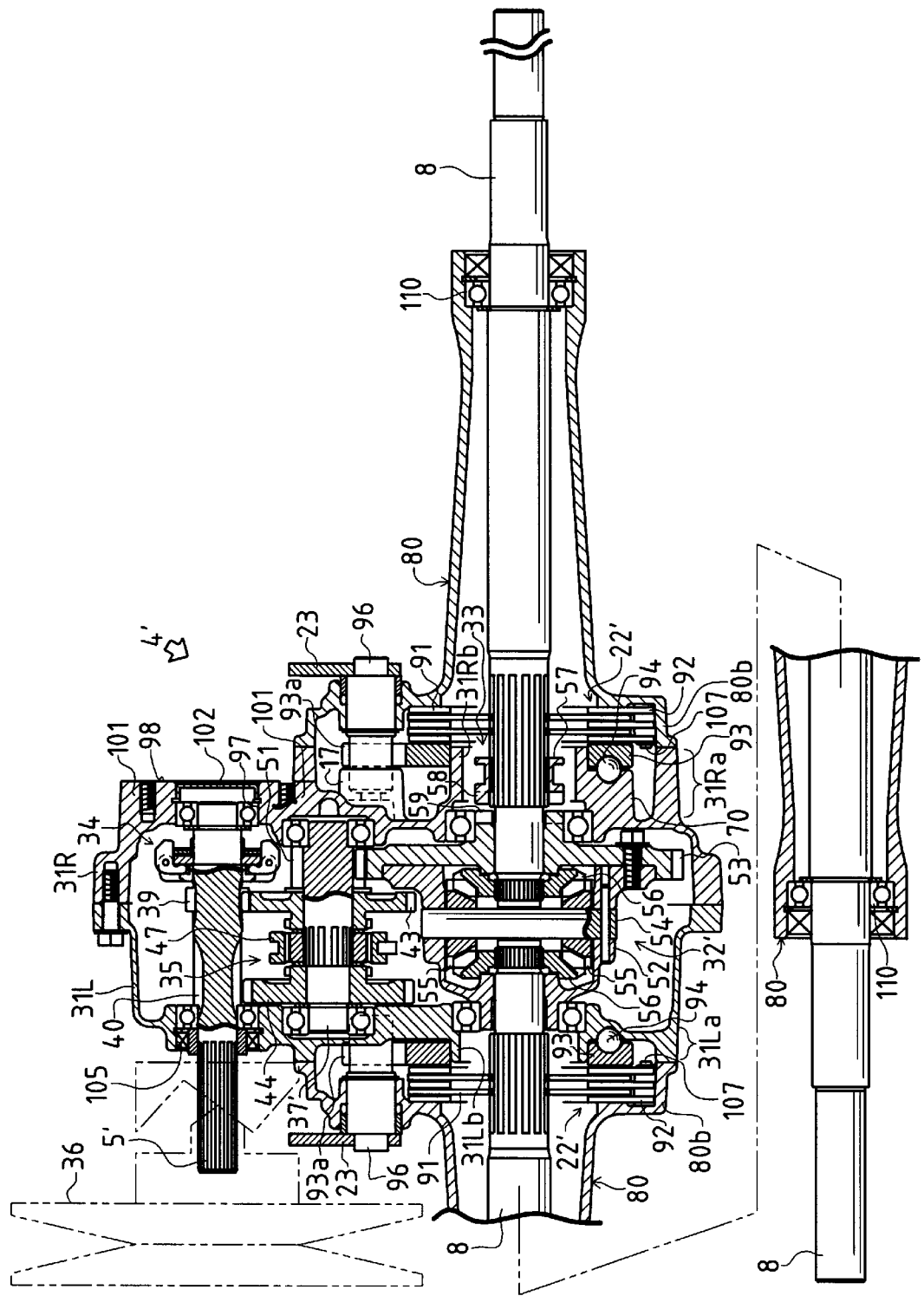
FIG. 8 is a sectional rear development showing the structure in a transmission housing.
Figure 9:
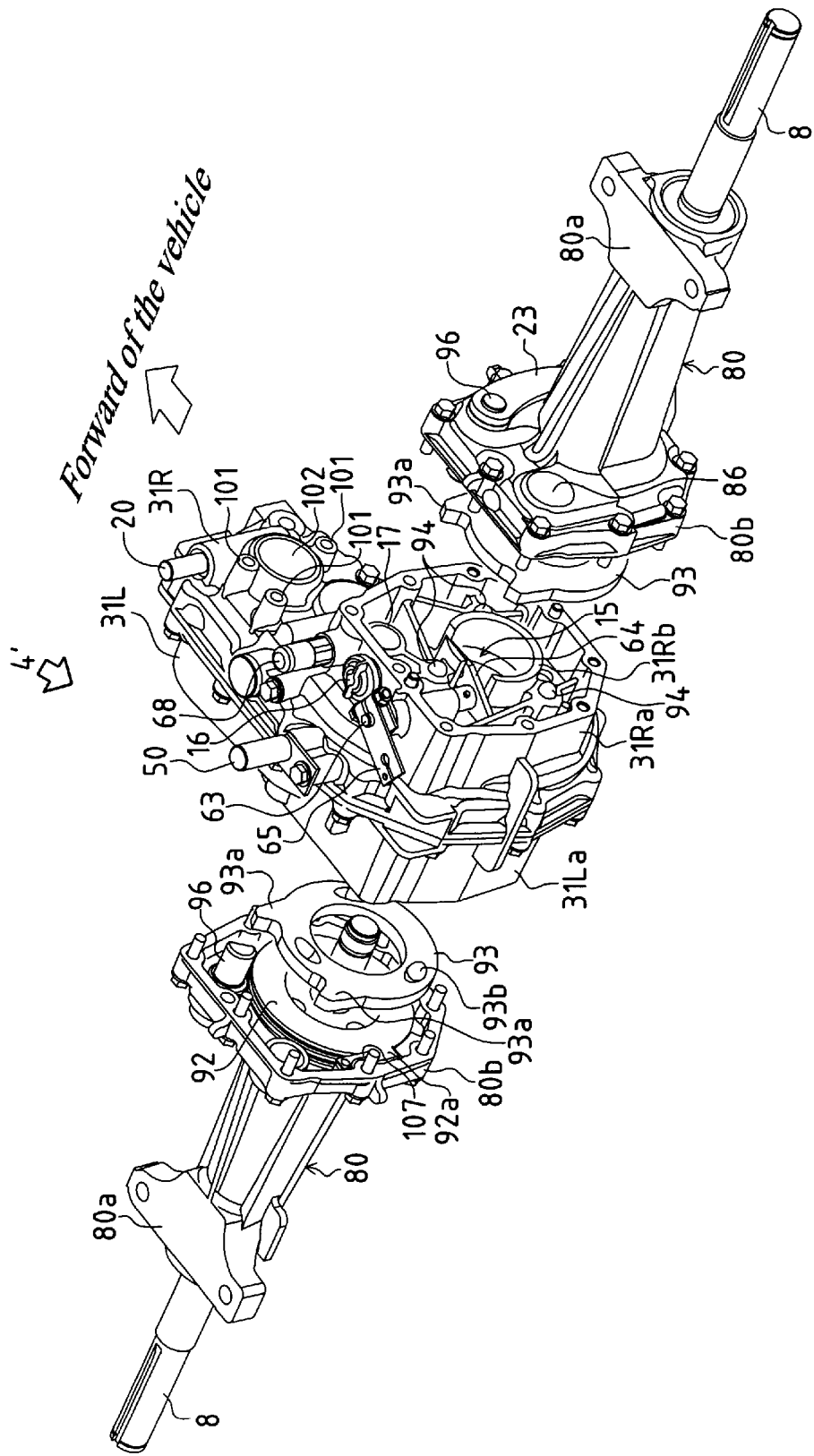
FIG. 9 is a perspective view showing the state wherein axle housings are detached from a transmission housing.

As shown in FIGS. 8 and 9, each of the left and right housing members 31L and 31R is formed at its outer side wall into each of left and right cylindrically flanged portions 31La and 31Ra which are extended laterally outward. The outer end surface of each of the cylindrically flanged portions 31La and 31Ra is formed into a vertical flat joint face, on which the above-mentioned axle housing 80 is mounted.

Figure 10:
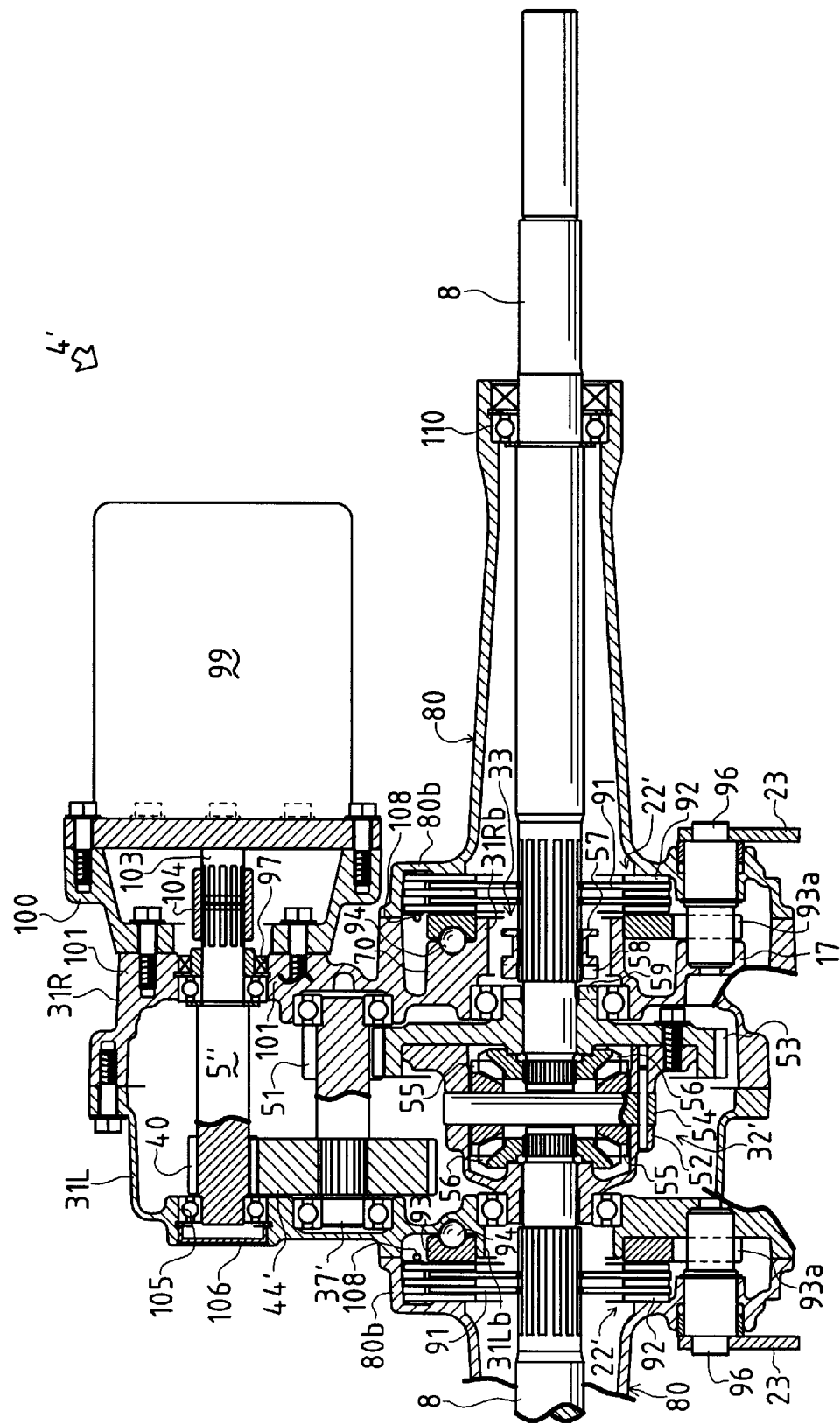
FIG. 10 is a sectional rear view showing a transmission of the type which receives power from an electric motor.

As shown in FIG. 8, a hole 97 is formed on the side wall of the right housing member 31R, and one end portion of an input shaft 5' of the transmission 4' is supported in the hole 97 through a bearing. As shown in FIG. 10, a mounting surface 98, onto which an electric motor 99 is mounted through a bracket 100, is formed on an outer face of the side wall around of the hole 97 of the right housing member 31R. Namely, the housing members 31L and 31R are available for both of an engine type and an electric motor type. Reference numerals 101 in FIGS. 8 and 9 designate as mounting bosses formed on the right housing member 31R for screwing the bracket 100 onto the mounting surface 98.

In the engine type shown in FIG. 8, which receives power from the engine 3 through the CVT 7, the input shaft 5' projects outward through the side wall of the left housing member 31L, and the hole 97 in the right housing member 31R is closed by a cover 102.

On the other hand, in the electric motor type shown in FIG. 10, an input shaft 5" projects outward through the hole 97 and is connected with a motor shaft 103 of the electric motor 99 through a coupler 104. In this type, a cover 106 closes a hole 105 in the left housing member 31L.

In the electric motor type, the direction-of-travel switching mechanism 35 (as provided in the engine type) is removed, and the input shaft 5" and an output shaft 37' are constantly engaged with each other through a gear 44'. Because, the electric motor 99 itself can bring the input shaft 5" into a regularly directed rotation or a reversely directed rotation selectively.

Figure 12:
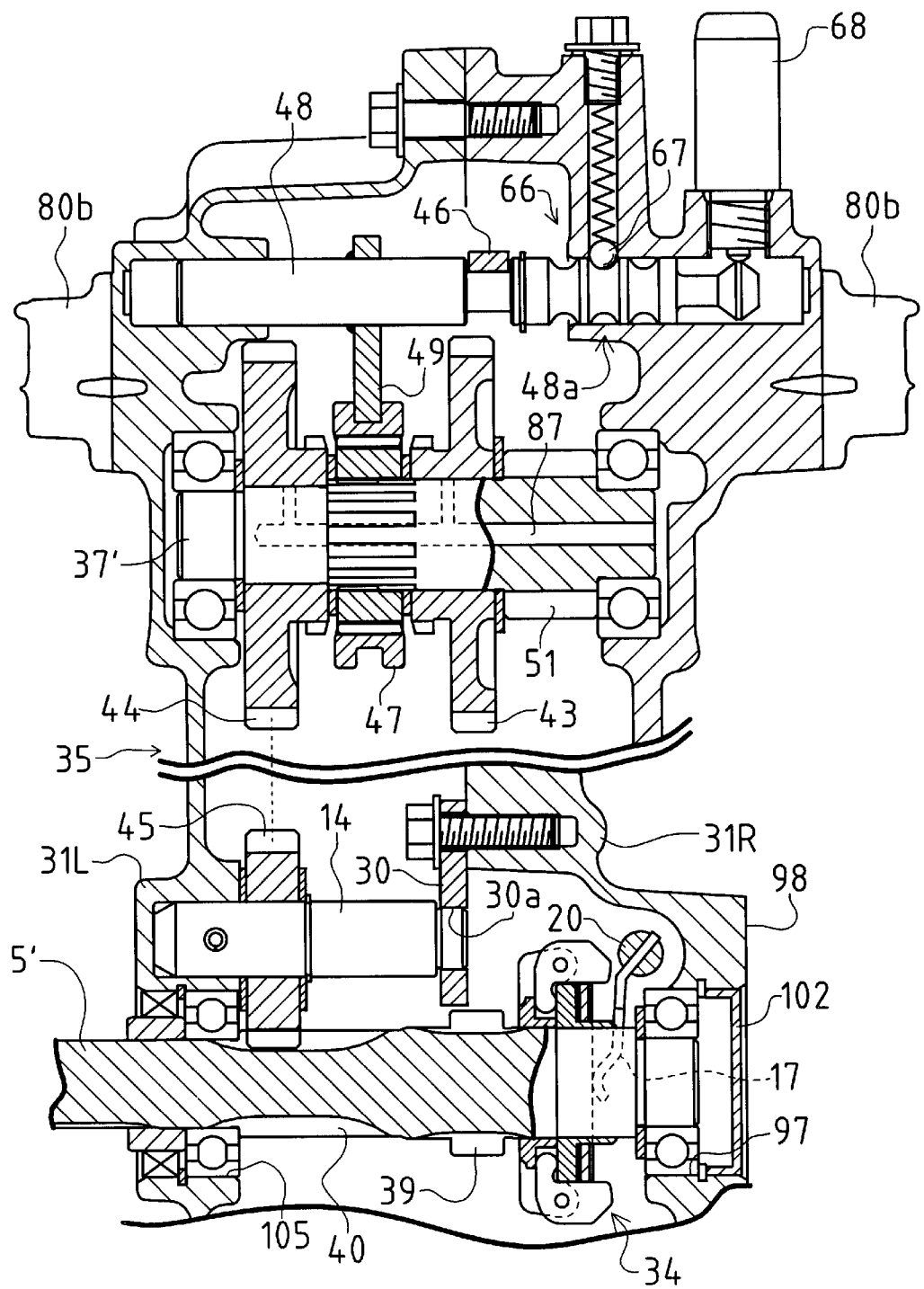
FIG. 12 is a grossly enlarged sectional rear development mainly showing the structure of a clutch fork shaft and an idle gear.
Figure 14:
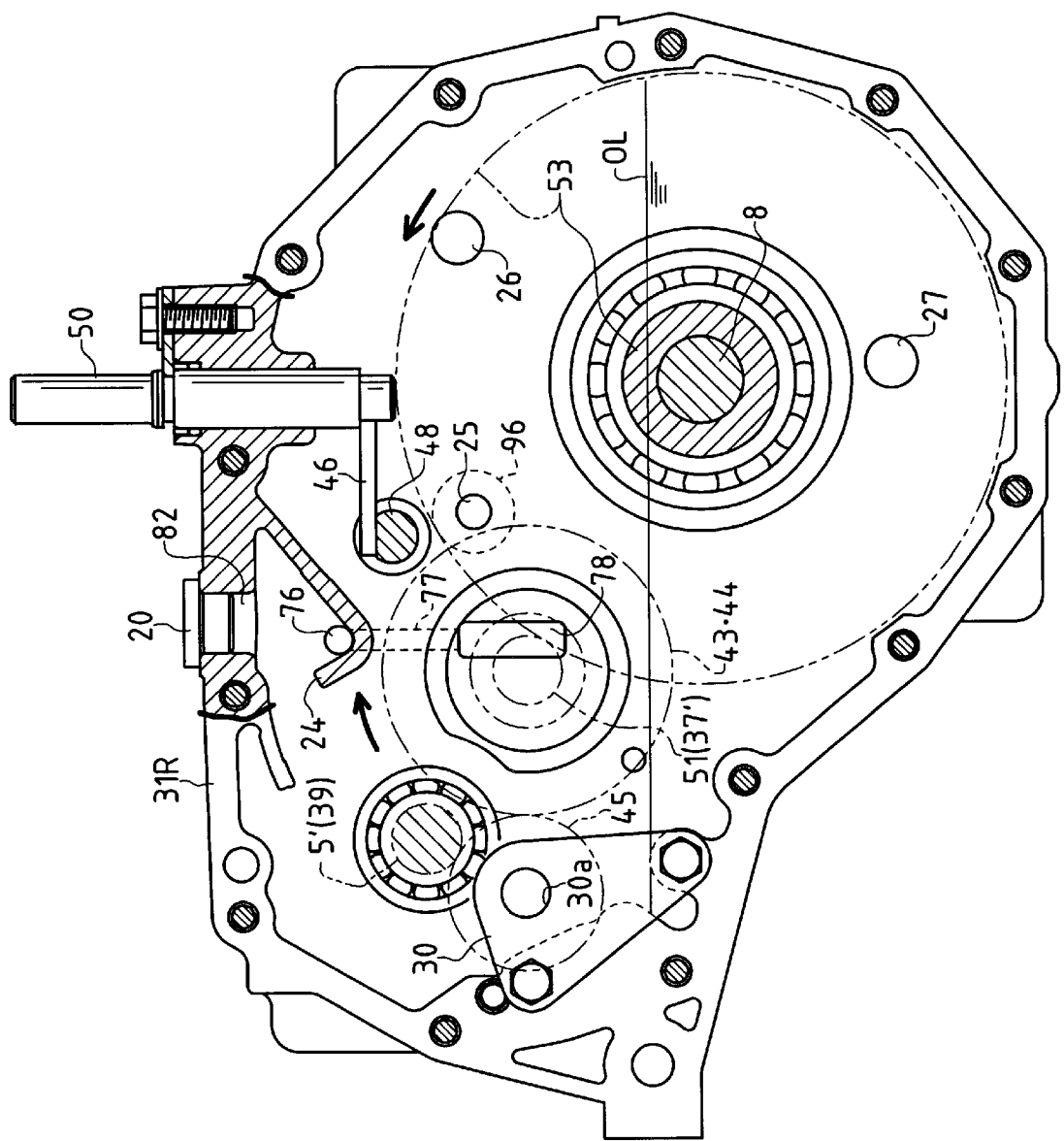
FIG. 14 is a sectional side view mainly showing the structure of a direction-switching shaft.
Figure 15:
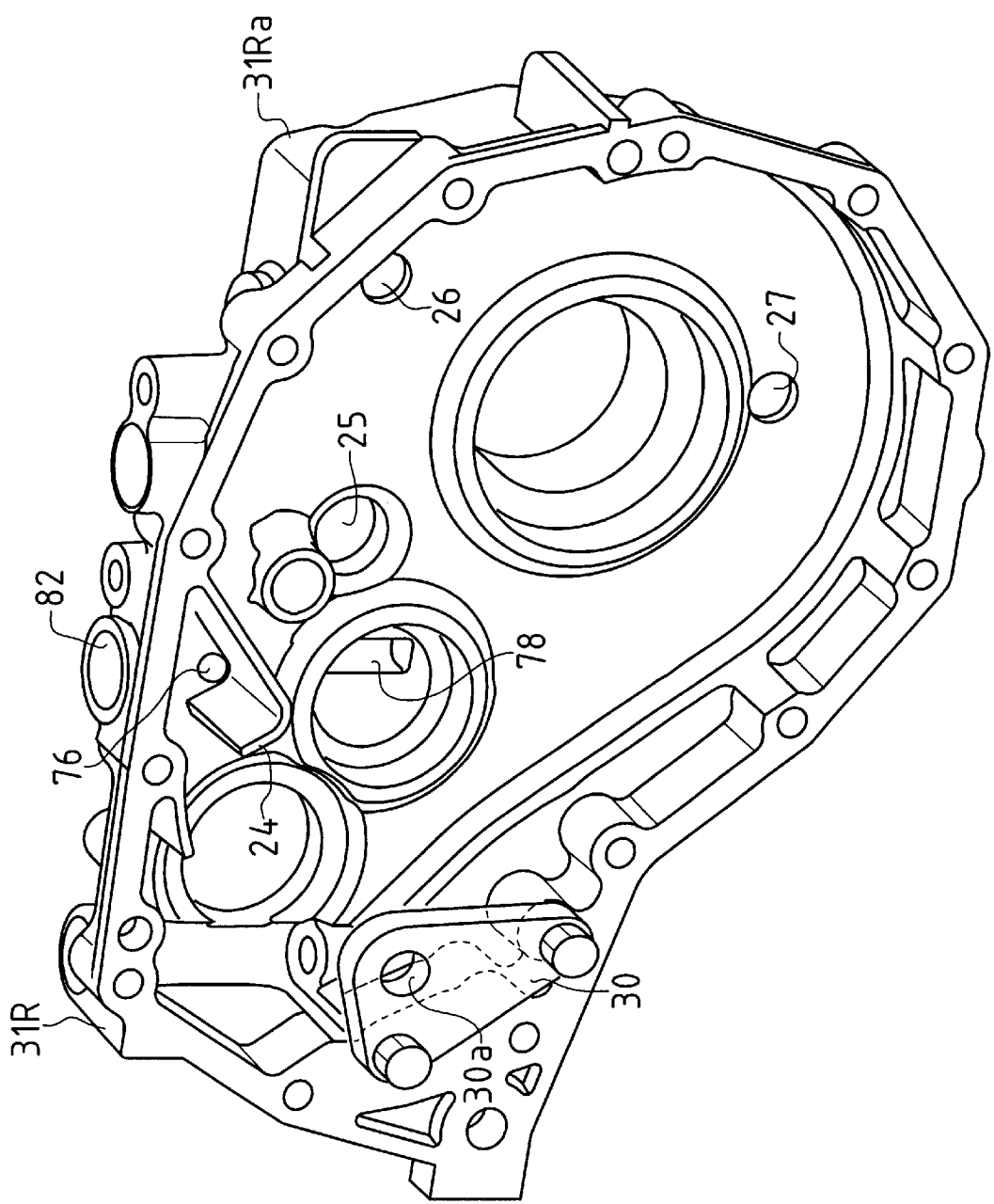
FIG. 15 is a perspective view showing a right housing member composing the transmission housing.

The engine type will be described in accordance with FIG. 12 and greater. As shown in FIG. 12, the idle gear 45 in the direction-of-travel switching mechanism 35 is supported rotatably on a shaft 14. A left end of the shaft 14 is supported by a boss formed on the inner face of the side wall of the left housing member 31L. As shown in FIGS. 12, 14, and 15, the joint surface, which is formed on the left housing member 31L to join with the right housing member 31R, partly projects inward of the transmission housing 31. A support plate 30 is screwed to the projected portion, and a right end of the shaft 14 is inserted and fitted into a circular hole 30a formed in the support plate 30.

In this structure, the shaft 14 is rattle-free because the both ends of the shaft 14 are supported. And, the shaft 14 is not required to be so long as a whole width of the transmission housing 31, thereby improving compactness. Other mechanics (in this embodiment, the rotation shaft 74 and the governor fork 73 of the centrifugal governor 34) can be placed in such formed empty space.

As shown in FIGS. 8 and 12, a forward follower gear 43 and a backward follower gear 44 are relatively rotatably supported around the output shaft 37'. The forward follower gear 43 is constantly engaged with the forward drive gear 39 formed around the input shaft 5', and backward follower gear 44 is with the reverse drive gear 40 through the idle gear 45.

Between the two follower gears 43 and 44, a clutch slider 47 is not relatively rotatably but axially slidably disposed around the output shaft 37'. The clutch slider 47 is axially slidden so as to engage with either the forward follower gear 43 or backward follower gear 44, thereby selectively bringing the output shaft 37' into a regularly directed rotation or a reversely directed rotation. Also, the clutch slider 47 can be located at its neutral position where it engages with none of the two gears 43 and 44.

The clutch fork shaft 48 is straightly slidably supported by the transmission housing 31, as shown in FIG. 12. The clutch slider 47 is engaged with the clutch fork 49 which is fixed onto the midway portion of the clutch fork shaft 48.

As shown in FIGS. 9 and 14, a direction-switching shaft 50 is vertically supported at the ceiling of the right housing member 31R. An arm 46 is fixed onto the end portion of the direction-switching shaft 50 in the transmission housing 31. An apex end portion of the arm 46 is engaged with the groove notched on a midway portion of the clutch fork shaft 48. The speed-changing lever (not shown), which is interlocked with the switching lever 19 provided beside the operator's seat 2 of vehicle, is fixed onto an external-of-housing end portion of the direction-switching shaft 50.

In the above structure, the clutch slider 47 can be slidden among a forward-driving position, a backward-driving position and a neutral position according to operation of the switching lever 19.

A detent mechanism 66 is provided with the clutch fork shaft 48 to keep its operating positions. The detent mechanism 66 comprises three grooves 48a notched on the clutch fork shaft 48 in correspondence to the above-mentioned three operating positions (the forward-driving position, the backward-driving position and the neutral position), and a detent ball 67 biased by spring so as to engage with one of the three grooves 48a.

An electrical switch 68 is provided with the clutch fork shaft 48 so as to detect its neutral position. The switch 68 is electrically connected with a circuit for starting a cell motor of the engine 3, thereby allowing the engine 3 to start only when the clutch fork shaft 48 is located in its neutral position.

Next, description will be given on a differential 32'. The differential 32' is constructed almost similarly with the differential 32 of above-mentioned embodiment, except that a differential locking mechanism 33 is provided.

The differential locking mechanism 33 is provided for locking the differential 32'. As shown in FIG. 8, a differential locking slider 57 is axially slidably provided around the right rear axle 8 on the opposite side to the differential casing 52 with the ring gear 53 between. A dog clutch portion 58 is formed on the surface of the differential locking slider 57 facing the ring gear 53. An engaging portion 59 is formed at a boss of the ring gear 53 so as to engage with the dog clutch portion 58.

In this structure, the differential locking mechanism 33 can be selected among the differential-locked mode wherein the dog clutch portion 58 is engaged with the engaging portion 59 and the differential casing 52 is connected integrally with the left and right rear axles 8, and the differential-unlocked mode wherein the dog clutch portion 58 is disengaged from the engaging portion 59 and the differential 32' connects the rear axles 8 in a differential manner.

Figure 13:
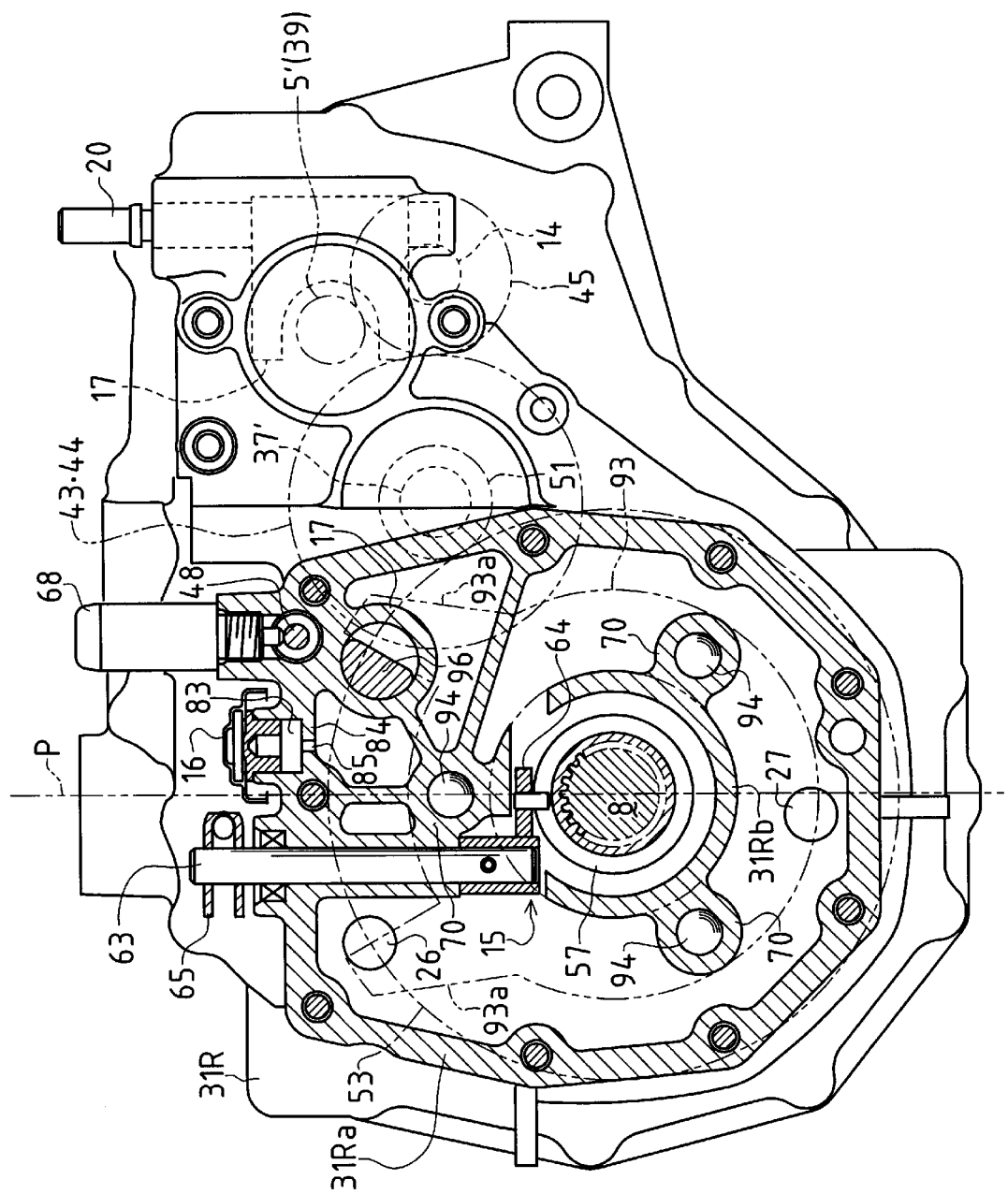
FIG. 13 is a sectional side view showing the structure that a differential shift arm is inserted through a partly notched portion of the guide portion.

As shown in FIGS. 9 and 13, a differential control shaft 63 is rotatably and vertically supported by the right housing member 31R. A differential shift arm 64, the apex end of which is engaged with the differential locking slider 57, is fixed onto one end of the differential control shaft 63 which projects in an inward direction of the transmission housing 31.

A differential locking control arm 65 is fixed onto one end of the differential control shaft 63 which projects in an outward direction of the transmission housing 31. The differential locking control arm 65 is connected to the differential-locking operating tool (not shown) provided beside the operator's seat 2 through a linkage etc., thereby allowing operating to bring the differential 32' into either a locked mode or an unlocked mode.

Next, the brake devices 22' in this embodiment will be described.

As shown in FIG. 8, the boss of the ring gear 53 is supported by the side wall of the right housing member 31R, and a boss of the differential casing 52 is by the side wall of the left housing member 31L. Both of the side walls project cylindrically in an outward direction, thereby forming above-mentioned flanged portions 31La and 31Ra. The cylindrically flanged portions 31La and 31Ra, formed for mounting the axle housing 80, forms its internal space into empty space (hereafter referred to as 'jointing space').

Figure 16:
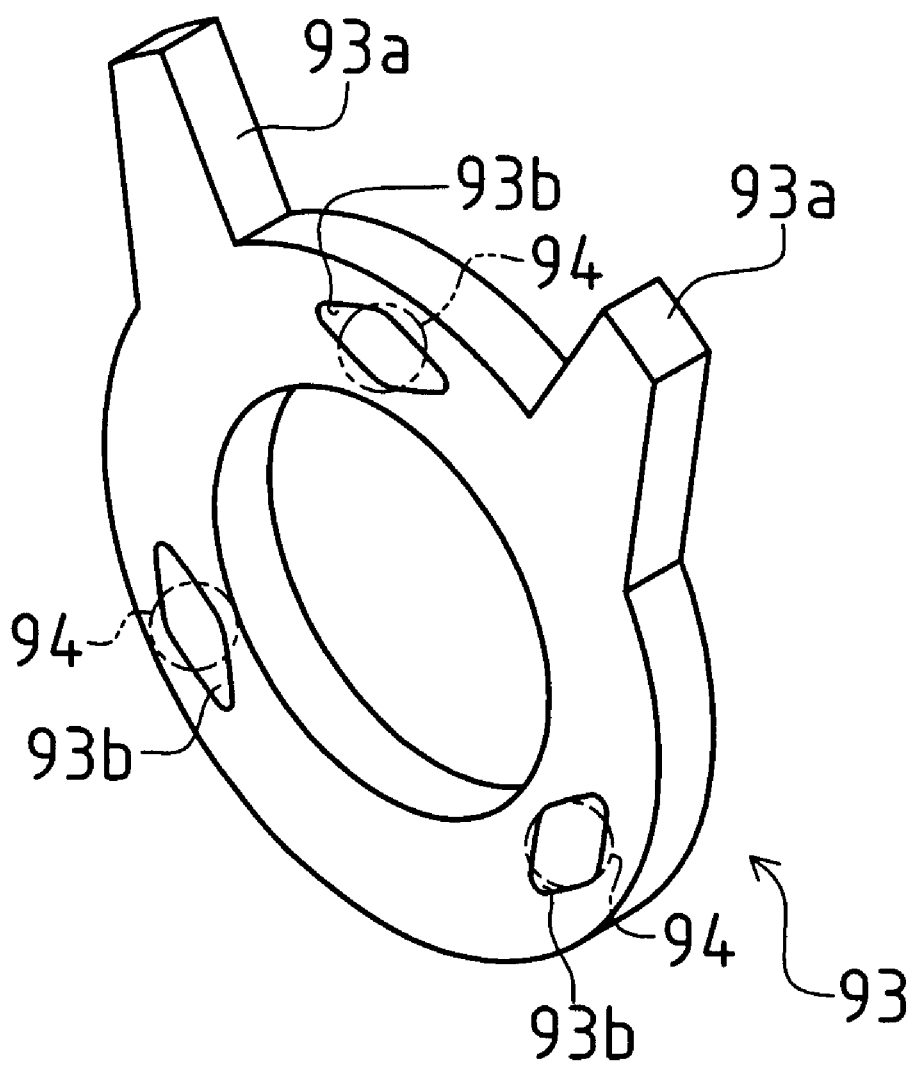
FIG. 16 is a perspective view showing a pressure member.
Figure 17:
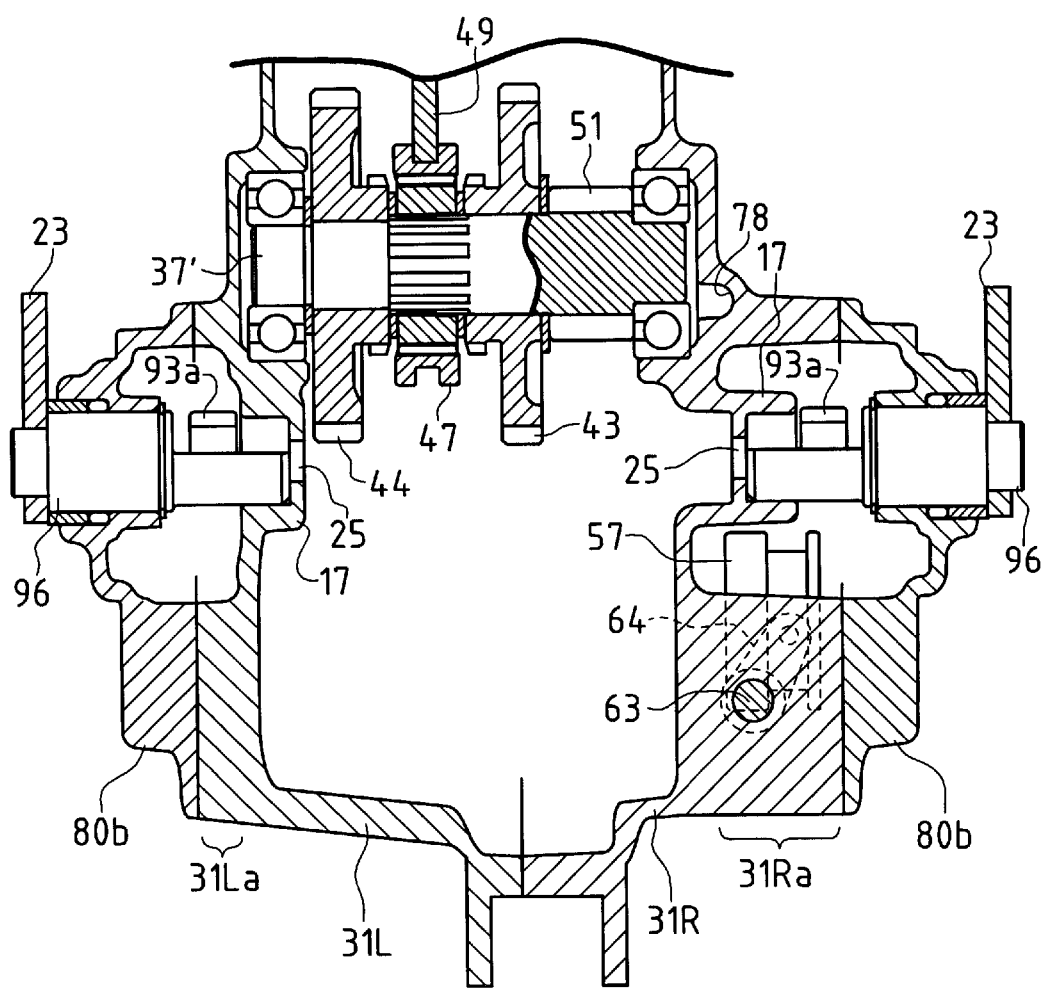
FIG. 17 is a sectional plan development showing brake control shafts.

Besides, in above-mentioned 'jointing space', left and right outer walls of the housing members 31L and 31R project cylindrically in a laterally outward direction, thereby forming guide portions 31Lb and 31Rb. A pair of left and right pressure members 93 are fitted around the guide portions 31Lb and 31Rb respectively, and supported relatively rotatably and axially slidably. Each of the pressure members 93 has a ring-shape as shown in FIG. 16, and its internal diameter is equal to an external diameter of the guide portions 31Lb and 31Rb. Two hooks 93a are formed on the external periphery of each of the pressure members 93.

The differential locking slider 57 is placed in the guide portions 31Rb of the right housing member 31R.

As shown in FIGS. 8, 9, 13, and 17, a pair of brake control shafts 96 are rotatably supported above the pressure members 93 in parallel with the rear axles 8. An inner end portion of each of brake control shafts 96 is supported by a boss 17 formed on the side wall of each of left and right housing members 31L and 31R. An outer end portion of each of the brake control shafts 96 is supported by each of the axle housings 80 and projects outward. The above-mentioned brake control arm 23 is fixed onto the outward projecting portion of the brake control shaft 96.

As shown in FIG. 13, a midway portion of the brake control shaft 96, which faces one of the two hooks 93a of the pressure member 93, is formed into a cam having a D-shape. In this structure, when the brake control arm 23 is operated and the brake control shaft 96 are rotated, the cam pushes the hook 93a, thereby the pressure member 93 is rotated around the guide portion 31Lb (31Rb).

As shown in FIG. 8, a plurality of depressions, each of which is formed into a hemispherical shape, are arranged at regular intervals in circumference on the side wall of the left housing member 31L at the outside of the guide portion 31Lb. And, as shown in FIGS. 8 and 13, a plurality of ball retaining portions 70 project from the side wall of the right housing member 31R in correspondence to above-mentioned depressions. A depression, having a hemispherical shape, is formed on each of the ball retaining portions 70.

In correspondence to the position of the depressions, a plurality of depressions 93b are formed and arranged at regular intervals in circumference on one side face as shown in FIG. 16. Each of the depressions 93b looks like a lozenge in a side view and like a cone in a sectional view, such that the depth of the depression 93b is the greatest at a center portion in circumference.

A steel ball 94 is supported by each of the hemispherical depressions of the housing member 31L (31R), and the pressure member 93 is fitted around the guide portion 31Lb (31Rb) such that each of the steel balls 94 is fitted into each of the depressions 93b. The each of above-mentioned friction discs 91 and 92 are disposed between the other side face of the pressure member 93 and the inner side face of the axle housing 80.

In this structure, when the pressure member 93 is rotated along an outer peripheral surface of the guide portion 31Lb (31Rb) by the operation of brake control arm 23, the pressure member 93, onto which the cam action of the steel balls 94 is applied, gets thrust (greater as its rotational degree increases) and is slidden outward, thereby pressuring the friction discs 91 and 92 and braking the rear axles 8.

A projection 92a is formed at a portion of each disc of the second multi friction discs 92. Each of these projections 92a is engaged with a recess formed on inner surface of the axle housing 80. As shown in FIGS. 8 and 9, a holding hook 107 is fixed in the vicinity of the recess. An apex end of the holding hook 107 holds the projection 92a of an innermost disc of the second friction discs 92.

In above structure, when manufacturing of the transmission 4', each of the brake devices 22' can be installed in the each of the axle housings 80, and the holding hook 107 can prevent the friction discs 91 and 92 from being detached from the axle housing 80, thereby forming an assemblage of axle housing 80 and brake device 22' as shown in FIG. 9. Therefore, the transmission 4' can be simply assembled by mounting left and right such assemblages on the transmission housing 30.

Figure 11:
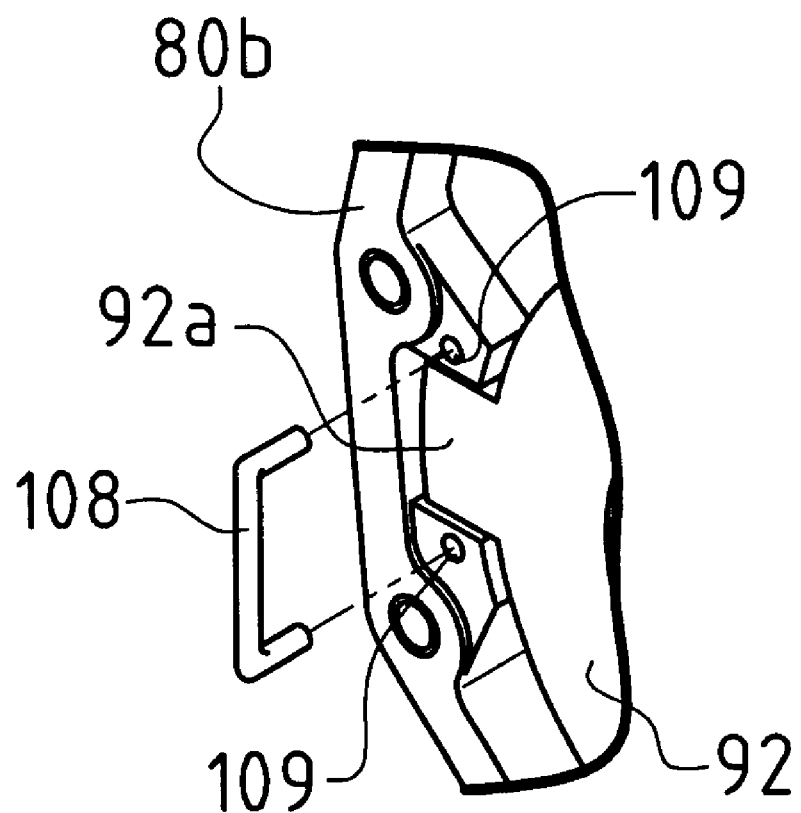
FIG. 11 is a segmentary perspective view showing the structure for holding friction discs to an axle housing in the brake device of the transmission of electric motor type.

Instead of the holding hook 107, the structure that an elastic wire having a U-like shape is fitted into two holes formed on the axle housing 80 such that the wire strides the projection 92a, is available. This structure is applied on the above-mentioned electric motor type as shown in FIGS. 10 and 11.

In this electric motor type, a distance between the two holes 109 formed on the axle housing 80 is a little shorter than a distance between both ends of the wire 108. Thus, when the wire 108 is fitted into two holes 109, the wire transforms such that its both ends approach each other. A friction force is generated between the fitted wire 108 and the two holes 109 by an elasticity of the wire 108 such that the wire 108 does not detach from the axle housing 80 and can hold the friction discs 91 and 92 of the brake device 22'.

The guide portion 31Rb is formed wider than the guide portion 31Lb, and the external diameter of the differential locking slider 57 is smaller than the internal diameter of the guide portion 31Rb (namely, smaller than the internal diameter of the pressure member 93). The differential locking slider 57 is provided at the inner space of the guide portion 31Rb, and is overlapped with the pressure member 93 in a longitudinal direction of the rear axles 8.

In this structure, the pressure member 93 and the differential locking slider 57 are provided in the above-mentioned 'jointing space'. And, because each of the guide portions 31Lb and 31Rb is cylindrically formed coaxially with a rotational axis of the rear axles 8, the rotational axis of the pressure member 93 is substantially coaxial with an axis of the differential locking slider 57 provided on the rear axle 8.

Thus, the differential locking slider 57 and the pressure member 93 can be disposed in a compact mass, thereby enhancing the transmission 4' in its compactness.

As shown in FIGS. 8 and 13, the differential locking slider 57 is disposed at inner space of the guide portion 31Rb of the right housing member 31R. As shown in FIGS. 9 and 13, the guide portion 31Rb is formed such that its cylindrical wall is partly notched, thereby forming an opening portion 15. The differential shift arm 64 is inserted through the opening portion 15, and an apex portion of the differential shift arm 64 is engaged with the differential locking slider 57.

As shown in FIG. 13, the differential control shaft 63, onto which the differential shift arm 64 is fixed, is disposed at a position which is offset from a virtual plane P containing the rotational axis of the pressure member 93. Therefore, the rotational axis of the differential control shaft 63 and the rotational axis of the differential shift arm 64 are disposed in skewed direction with each other and do not cross.

Thus, the differential locking slider 57 can be slidden through the rotation of the differential control shaft 63 and the differential shift arm 64. The only small space needed for rotation of the differential shift arm 64 is sufficient for operating the differential locking slider 57 in the transmission housing 31.

On the other hand, in the structure that the differential locking slider 57 is engaged with a shift fork which is slidden straightly, a large space is needed for shifting the shift fork, thereby inhibiting miniaturization of the transmission. The structure of this embodiment solves this issue.

In this embodiment, the brake control shaft 96 is placed on the opposite side to the differential control shaft 63 with the virtual plane P between. By this layout, a differential-locking operating system and a brake operating system can be disposed in a compact mass, and also can avoid interruptions with each other.

As shown in FIG. 8, the cylindrical flanged portion 31Ra and the guide portion 31Rb of the right housing member 31R are formed wider than the portions 31La and 31Lb of the left housing member 31L, because the differential locking slider 57 is disposed in the guide portion 31Rb. As shown in FIGS. 9 and 13, the electrical switch 68, the differential control shaft 63, and a breather cap 16 for bleeding of air are disposed at the widely-formed cylindrical flanged portion 31Ra, thereby achieving the rational layout for miniaturization of the transmission 4'.

In this embodiment, each of the axle housings 80 is formed symmetrically with respect to the virtual vertical plane which includes the axis of the rear axles 8. Thus, two members of uniform shape can be used for both of left and right axle housings 80, thereby reducing their manufacturing costs.

Furthermore, a pair of front and rear holes, formed on side walls of the respective axle housings 80, are arranged symmetrically with respect to above-mentioned virtual vertical plane. And, in the structure that axle housings 80 are disposed left and right, each of the front holes supports each of left and right brake control shafts 96, and each of the rear holes is covered by a cap 86 as shown in FIG. 9. Thus, the left and right brake control shafts 96 can be coaxially disposed, and left and right brake systems can be rationally symmetrically arranged.

Furthermore, two hooks 93a, formed on each of the pressure members 93, are arranged symmetrically as shown in FIG. 16. Thus, two members of uniform shape can be used for both of left and right pressure members 93, thereby reducing their manufacturing costs.

Next, the structure for lubrication of the transmission 4' will be described.

The transmission housing 31 is filled with lubricating oil in established amount, and an oil level OL is determined as shown in FIG. 14. In this state, when the transmission 4' is driven and the ring gear 53 and a forward follower gear 43 rotate in the direction designating as a bold arrow in FIG. 14, the oil is splashed on the input shaft 5' and the output shaft 37, which are disposed at upward slant position of the ring gear 53.

Figure 18:
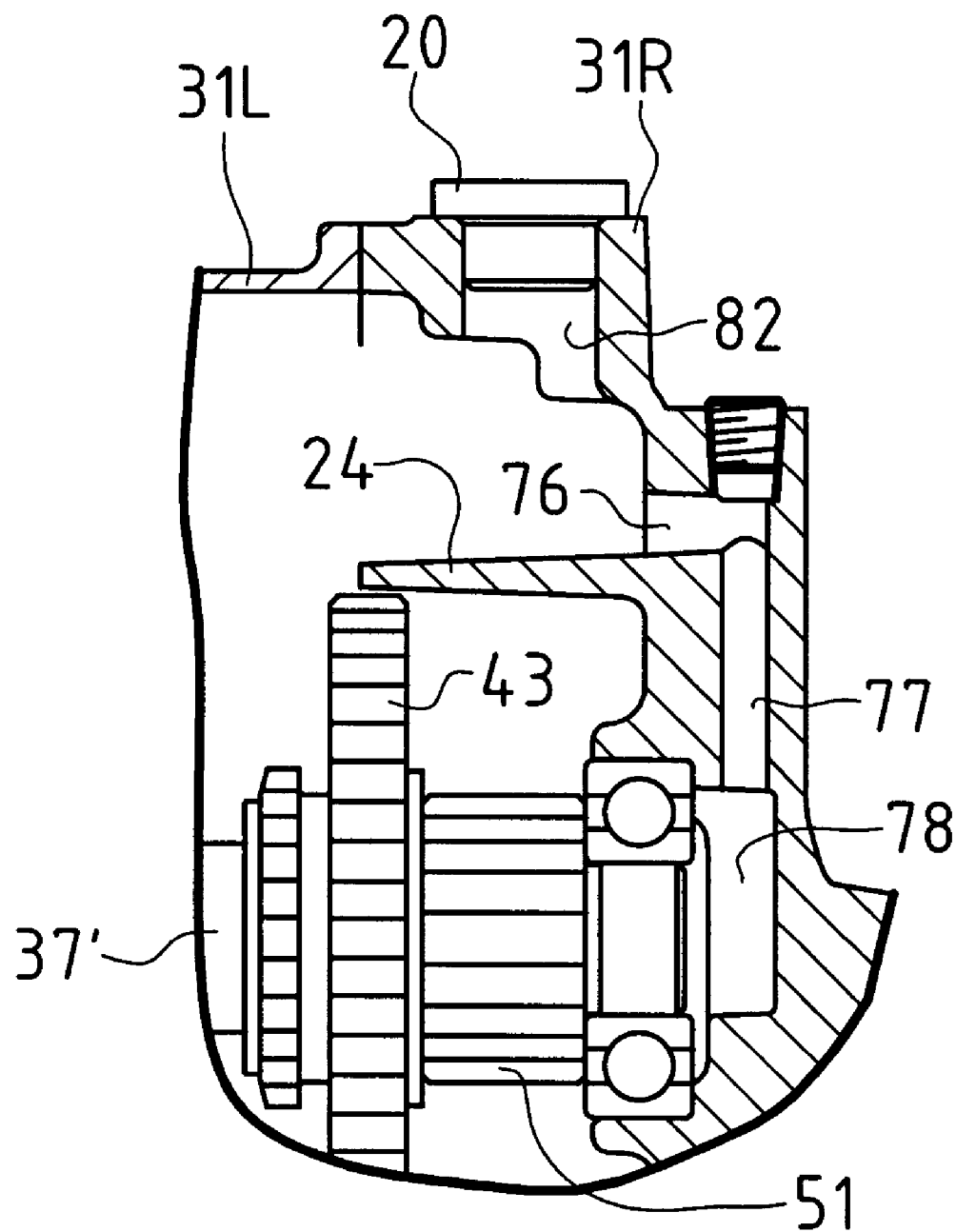
FIG. 18 is a sectional rear view showing the structure for leading lubricating oil to an output shaft.

As shown in FIGS. 14 and 18, a trough portion 24, having a V-shape in an interior side view, is formed on an inner face of side wall of the right housing member 31R. An oil leading hole 76 is formed in a horizontal direction on the portion of the right housing member 31R which faces a base of the trough portion 24. The oil leading hole 76 communicates with a connecting hole 77, which is formed vertically in the side wall of the right housing member 31R. The connecting hole 77 is connected with a groove 78, which is formed in a boss of the right housing member 31R for supporting an end of the output shaft 37'.

In this structure, a part of the splashes of oil by rotation of the ring gear 53 etc. reaches above the trough portion 24, and flows along the oil leading hole 76 and the connecting hole 77 and is led to the groove 78, thereby lubricating a bearing which supports the output shaft 37'. And, a part of the oil flows along an oil path (designated as a reference numeral 87 in FIG. 12), and lubricates the peripheral surface of the output shaft 37' for rotatably supporting the follower gears 43 and 44, and a engaging portion of the clutch slider 47.

As shown in FIGS. 14 and 18, a lubricating inlet 82 is disposed just above the trough portion 24. Therefore, when a cap 20 is taken off and lubricating oil is run in through the lubricating inlet 82, all the lubricating oil falls into the trough portion 24. A part amount of the lubricating oil can surely reach the groove 78 through the oil leading hole 76 and the connecting hole 77 and can lubricate the bearing supporting the output shaft 37' and so on.

In this structure, even if components (e.g. the bearing for supporting the output shaft 37, the follower gears 43 and 44, the clutch slider 47) are not spread with the lubricating oil in advance of assembling the transmission 4', these components are surely lubricated by only running the oil in through the lubricating inlet 82 after assembling the transmission 4'. Therefore, the number of man-hours for manufacturing can be reduced.

A hole 27 is formed at the bottom of side wall of the right housing member 31R as shown in FIG. 13. An inner space of the transmission housing 31 and an inner space of the right axle housing 80 communicate with each other through the hole 27 such that the oil with which both the inner space are filled can circulate between.

Furthermore, two holes 25 and 26 are formed at the top of side wall of the right housing member 31R. An inner space of the transmission housing 31 and an inner space of the right axle housing 80 also communicates with each other through the two holes 25 and 26 such that the air in both the inner space can circulate between. Thus, the air in the right axle housing 80 can be exhaled from the breather cap 16 disposed on the transmission housing 31.

Similarly, holes are formed on the side wall of the left housing member 31L (not shown). Therefore, the oil and air can circulate between the inner space of the transmission housing 31 and an inner space of the left axle housing 80.

As shown in FIG. 13, the breather cap 16 is disposed at the ceiling portion of the right housing member 31R. An opening portion 83 for installing the breather cap 16 is separated off by an inner wall 84 from the inner space of the transmission housing 31, and a small hole 85 is formed on the inner wall 84.

In this structure, the air in the transmission housing 31 can communicate with the atmosphere through the small hole 85 and the breather cap 16. And, even if the oil filled with the transmission housing 31 is stirred and splashed around, a splash of the oil is blocked by the inner wall 84 before reaching the breather cap 16, thereby preventing oil-leak from the breather cap 16.

Although the invention has been described in its preferred form with a certain degree of particularity, it is understood that the present disclosure of the preferred form may be changed in the details of construction, and the combination and arrangement of parts may be changed or altered without departing from the spirit and the scope of the invention as hereinafter claimed.

What is claimed is:

1. A transmission of a working vehicle, comprising:

a differential gear;

a transmission housing containing said differential gear;

a pair of left and right axles connected with each other in a differential manner by said differential gear;

an axle housing mounted onto one of left and right faces of said transmission housing to support of said left and right axles, wherein a joint space is formed in a joint portion between said transmission housing and said axle housing;

a differential locking slider which can switch between a differential mode for connecting said left and right axles with each other in a differential manner and a differential-locking mode for integrally connecting said left and right axles;

a friction disc provided on at least one of said left and right axles and housed by said axle housing;

a pressure member which pushes said friction disc so as to engage said at least one of said left and right axles with said axle housing, thereby braking said at least one of said left and right axles, wherein said pressure member and said differential locking slider are disposed substantially coaxially with each other in said joint space; and a guide portion for axially slidably supporting said pressure member, said guide portion being provided in a flanged portion formed on an outer side wall of said transmission housing for mounting said axle housing, wherein said differential locking slider is disposed in said guide portion, and wherein a round wall of said guide portion is partly notched, forming a notch portion such that an arm for operating said differential locking slider is inserted through said notched portion.

2. The transmission of a working vehicle as set forth in claim 1, wherein:

said pressure member is rotatable along said round wall of said guide portion by a brake operating shaft supported by said axle housing, and a cam body, which thrusts said pressure member in correspondence to as rotational degree of said pressure member, is supported around said round wall of said guide portion.

3. The transmission of a working vehicle as set forth in claim 2, wherein:

a rotational axis of said arm for operating said differential locking slider is disposed at a position which is offset from a virtual plane containing the rotational axis of said pressure member, and said brake operating shaft is placed in parallel with said left and right axles on a opposite side to said arm with the virtual plane between.

* * * * *